(12) United States Patent
Takahashi et al.

(10) Patent No.: US 11,477,433 B2
(45) Date of Patent: Oct. 18, 2022

(54) INFORMATION PROCESSOR, INFORMATION PROCESSING METHOD, AND PROGRAM

(71) Applicant: SONY CORPORATION, Tokyo (JP)

(72) Inventors: Kei Takahashi, Tokyo (JP); Tsuyoshi Ishikawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 36 days.

(21) Appl. No.: 16/982,870

(22) PCT Filed: Feb. 14, 2019

(86) PCT No.: PCT/JP2019/005205
§ 371 (c)(1),
(2) Date: Sep. 21, 2020

(87) PCT Pub. No.: WO2019/187732
PCT Pub. Date: Oct. 3, 2019

(65) Prior Publication Data
US 2021/0058609 A1 Feb. 25, 2021

(30) Foreign Application Priority Data

Mar. 30, 2018 (JP) .............................. JP2018-066734

(51) Int. Cl.
| H04N 13/282 | (2018.01) |
| H04N 13/279 | (2018.01) |
| G02B 27/01 | (2006.01) |
| G06F 3/01 | (2006.01) |
| G06F 3/0481 | (2022.01) |
| G09G 5/377 | (2006.01) |

(52) U.S. Cl.
CPC ......... *H04N 13/282* (2018.05); *G02B 27/017* (2013.01); *G06F 3/011* (2013.01); *G06F 3/0481* (2013.01); *G09G 5/377* (2013.01); *H04N 13/279* (2018.05)

(58) Field of Classification Search
None
See application file for complete search history.

(56) References Cited

U.S. PATENT DOCUMENTS

| 2010/0281375 | A1* | 11/2010 | Pendergast | G11B 27/34 715/723 |
| 2013/0182117 | A1* | 7/2013 | Arseneau | H04N 21/6181 348/157 |
| 2017/0171539 | A1* | 6/2017 | Inomata | G06F 3/012 |
| 2018/0267305 | A1* | 9/2018 | Liao | G06F 3/147 |

* cited by examiner

*Primary Examiner* — Eileen M Adams
(74) *Attorney, Agent, or Firm* — Paratus Law Group, PLLC

(57) ABSTRACT

To make it possible to more adequately perform switching between a filmed image of a camerawork operated by a user and a filmed image of a camerawork operated by a subject other than the user. There is provided an information processor including: an acquisition unit that acquires information regarding a motion of a user; and a control unit that controls, on a basis of the information regarding the motion of the user, switching between a first display region corresponding to a first camerawork operated by the user and a second display region corresponding to a second camerawork operated by a subject other than the user.

15 Claims, 17 Drawing Sheets

[ FIG. 1 ]
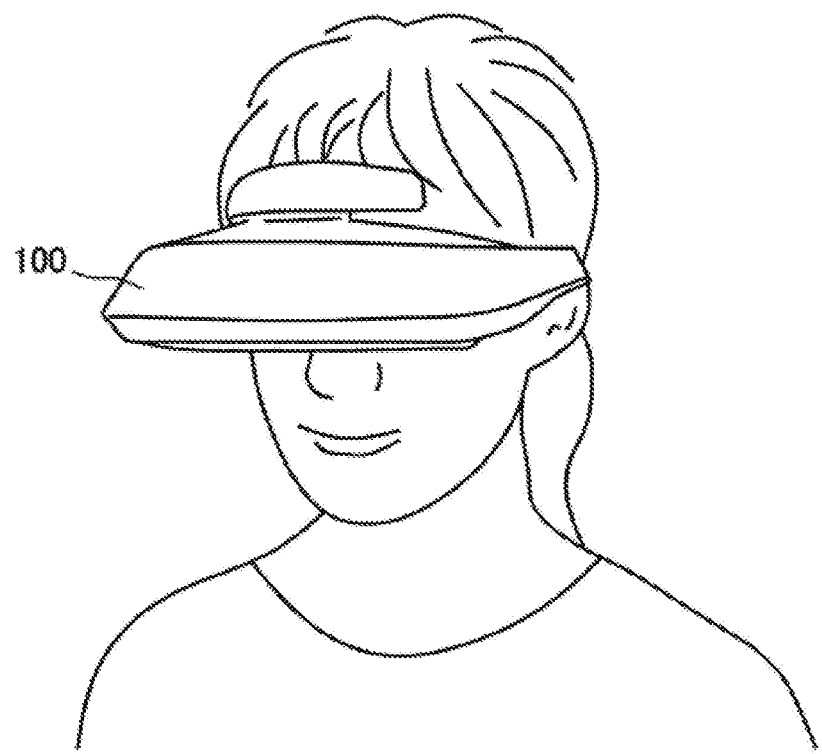

[FIG. 2]
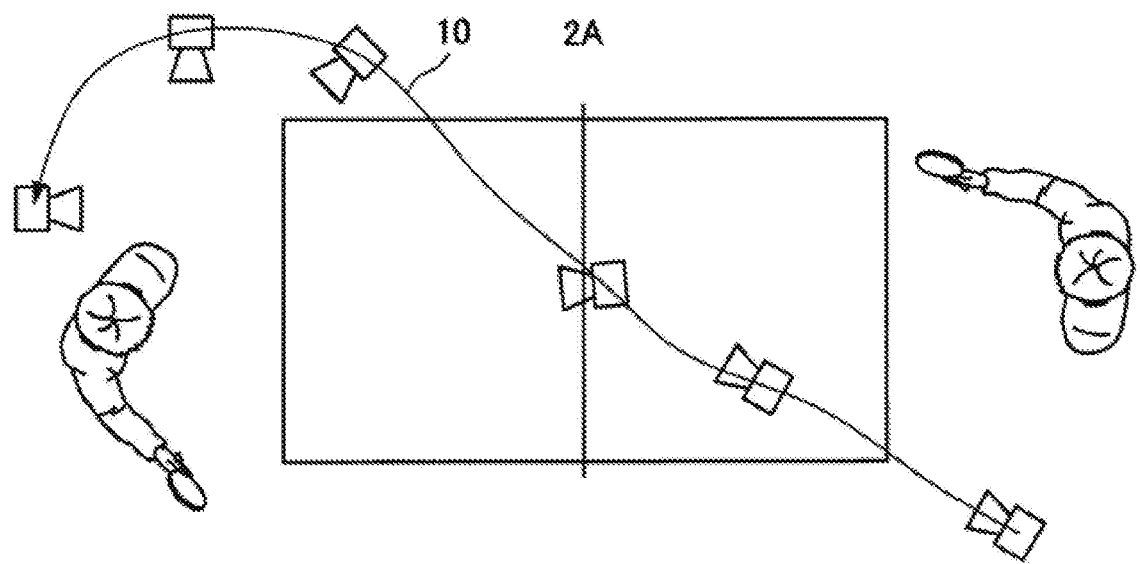
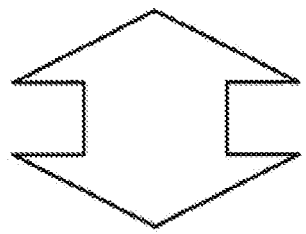
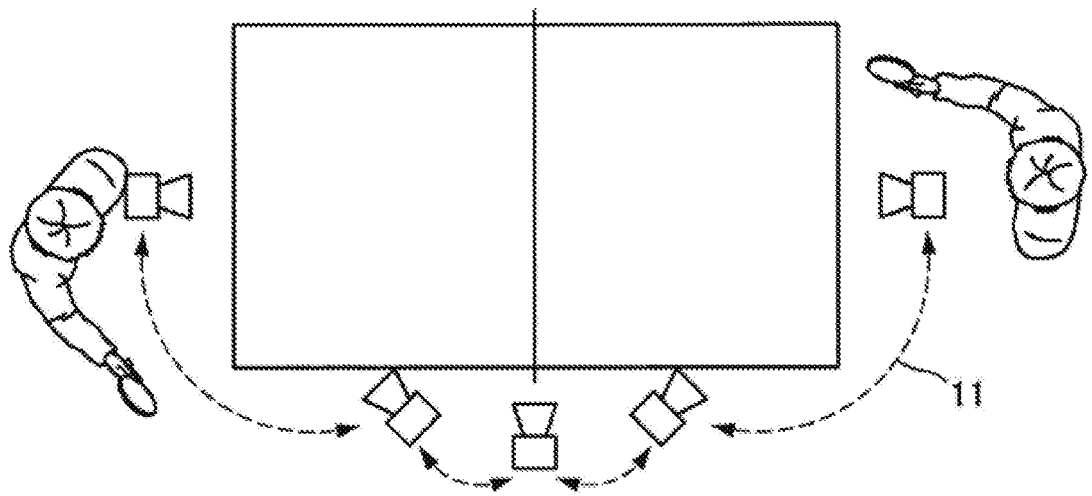

[ FIG. 3 ]
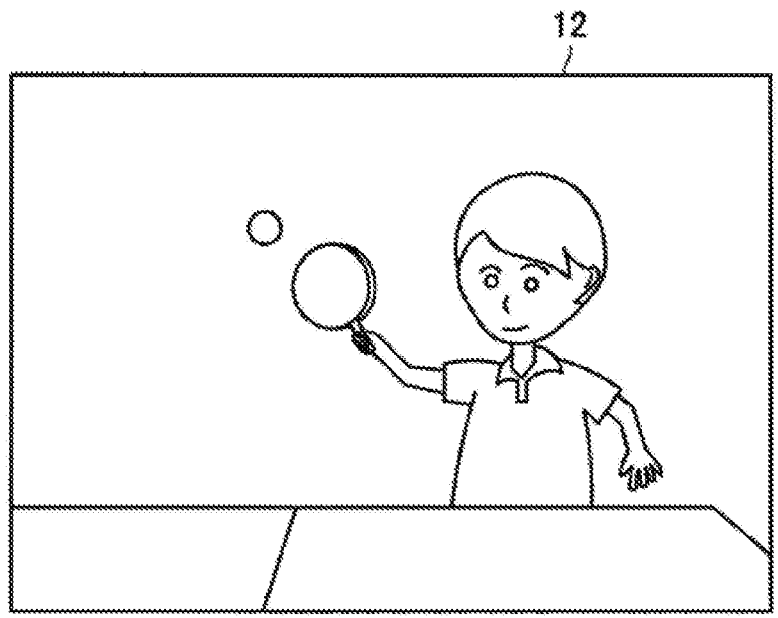
[ FIG. 4 ]
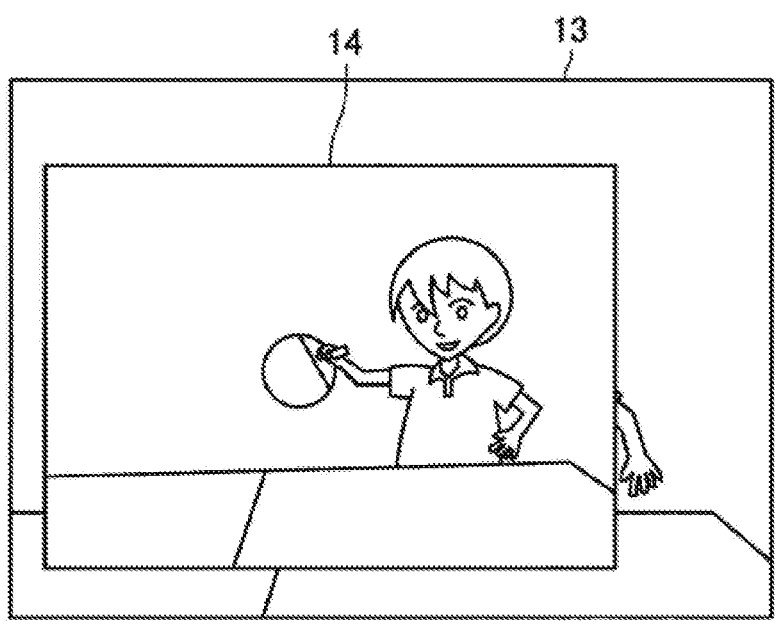

[ FIG. 5 ]
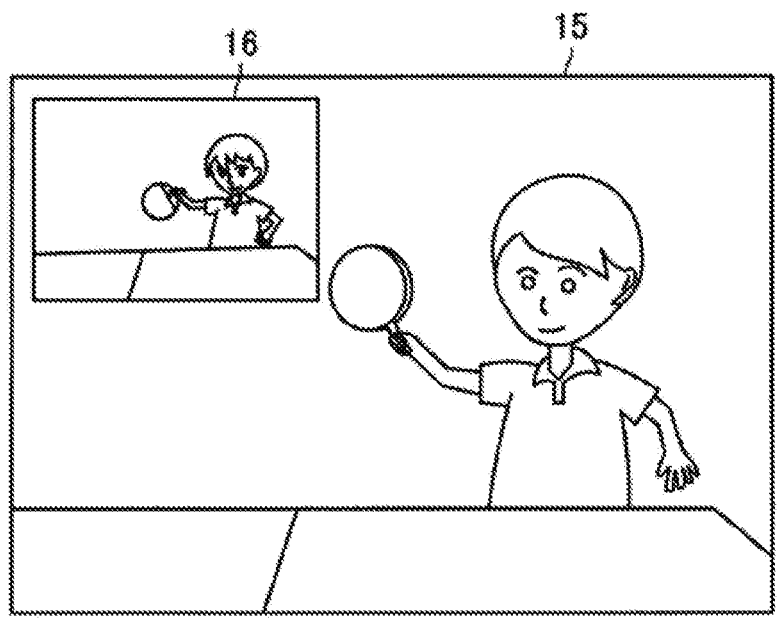

[FIG. 6]
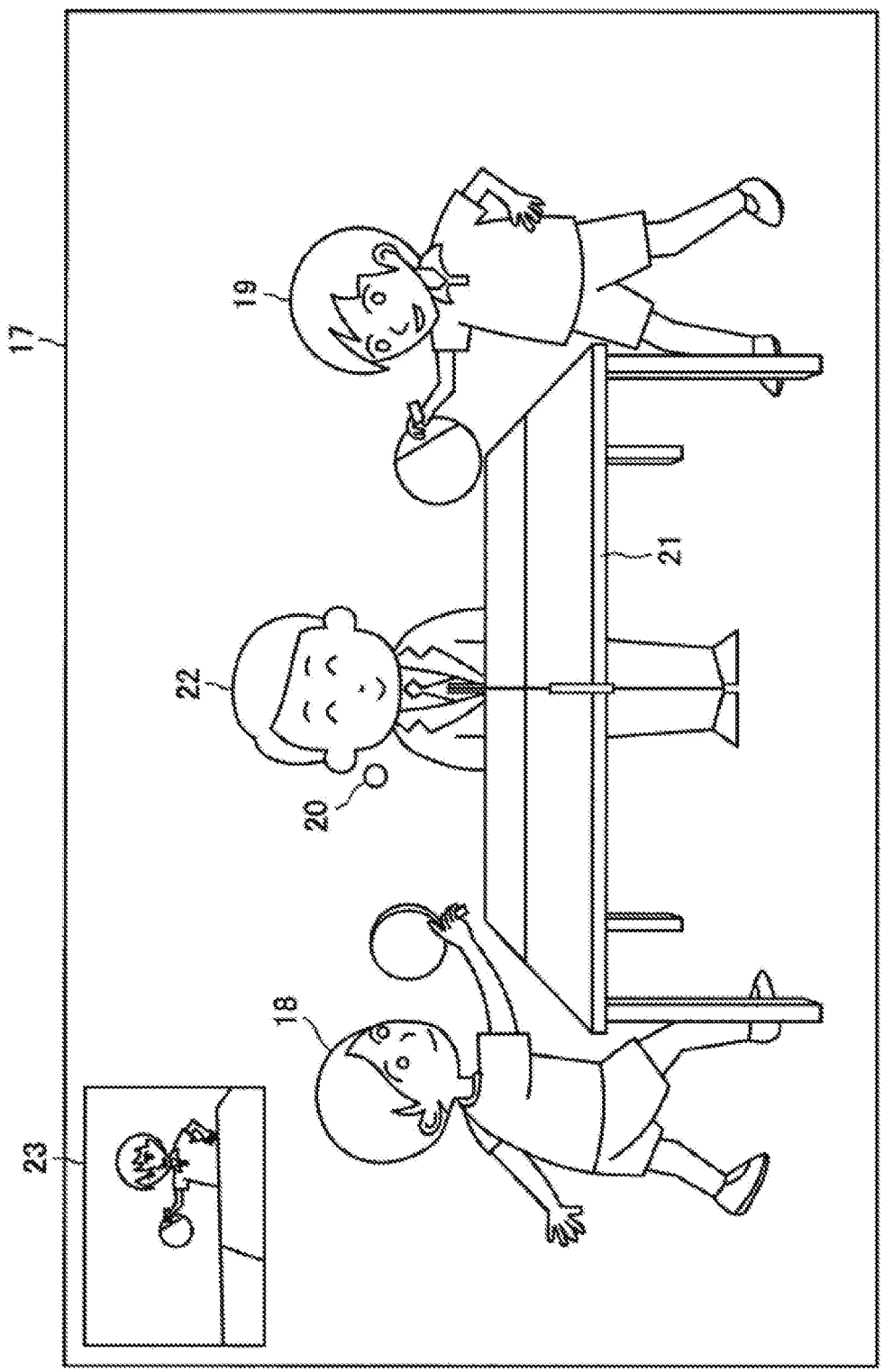

[FIG. 7]
7A
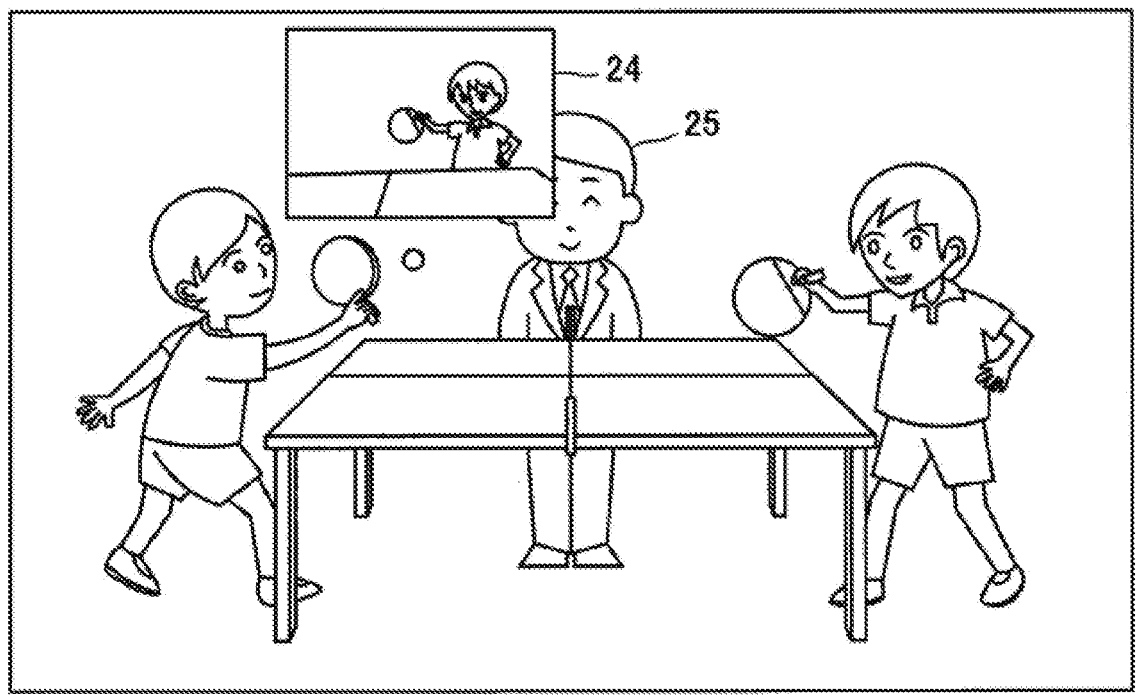
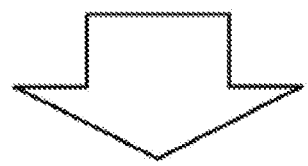
7B
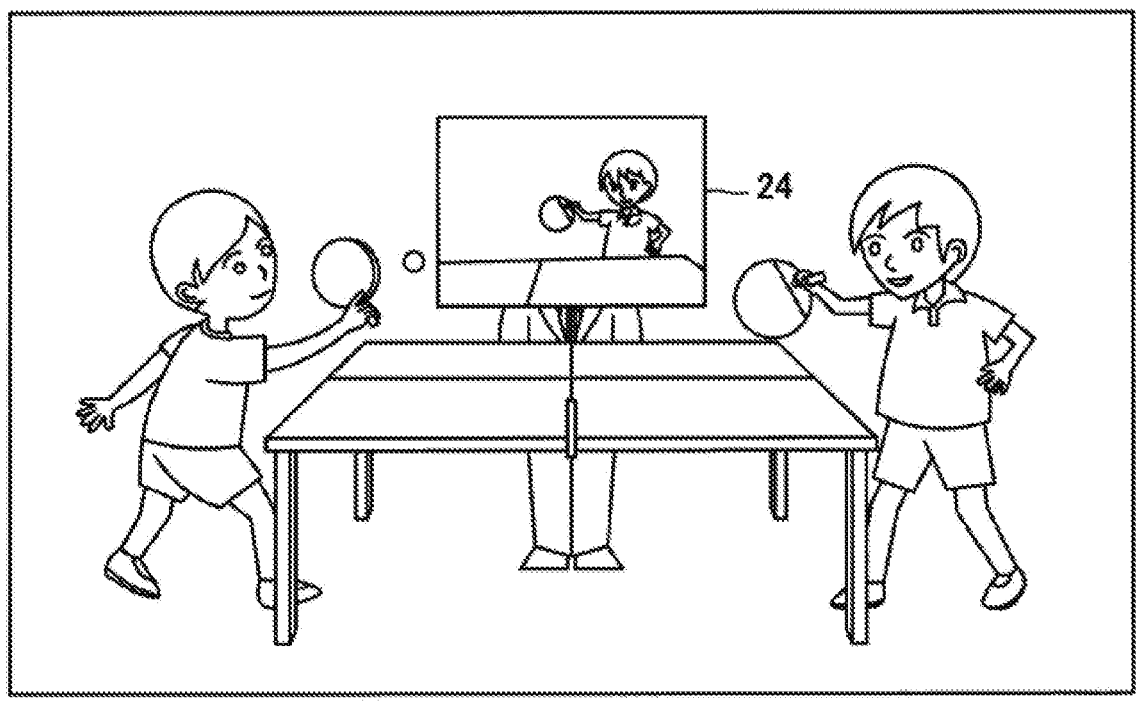

[FIG. 8]
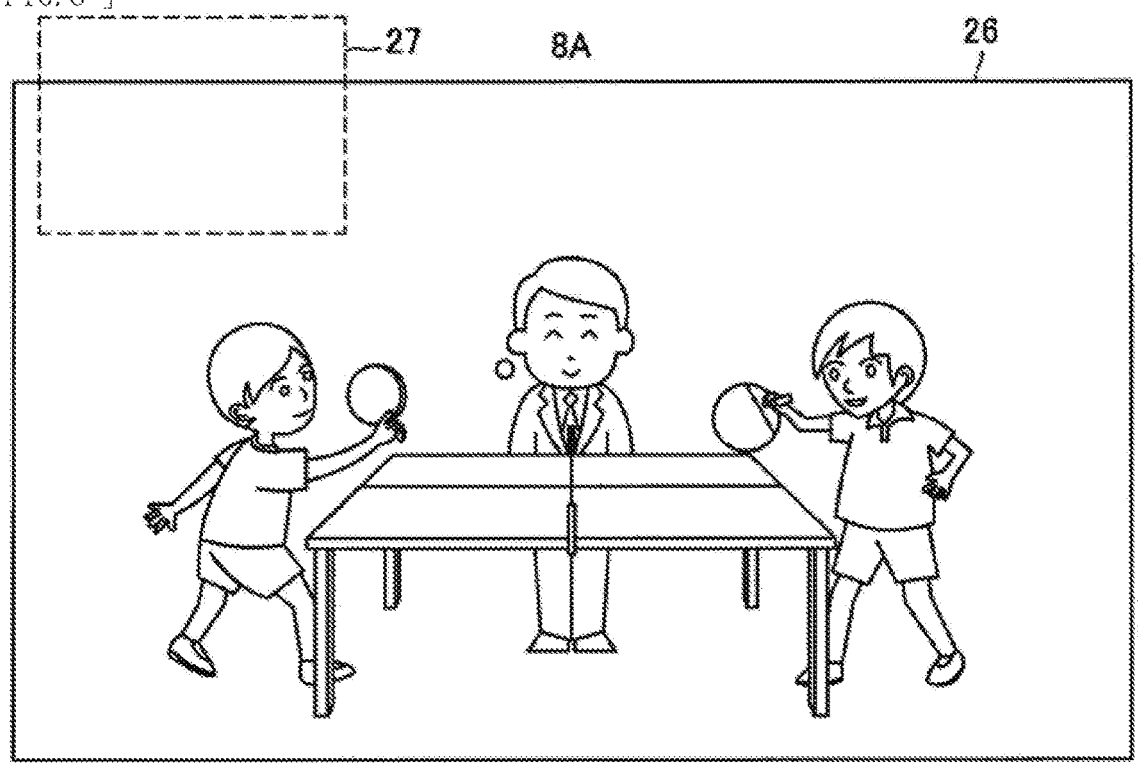
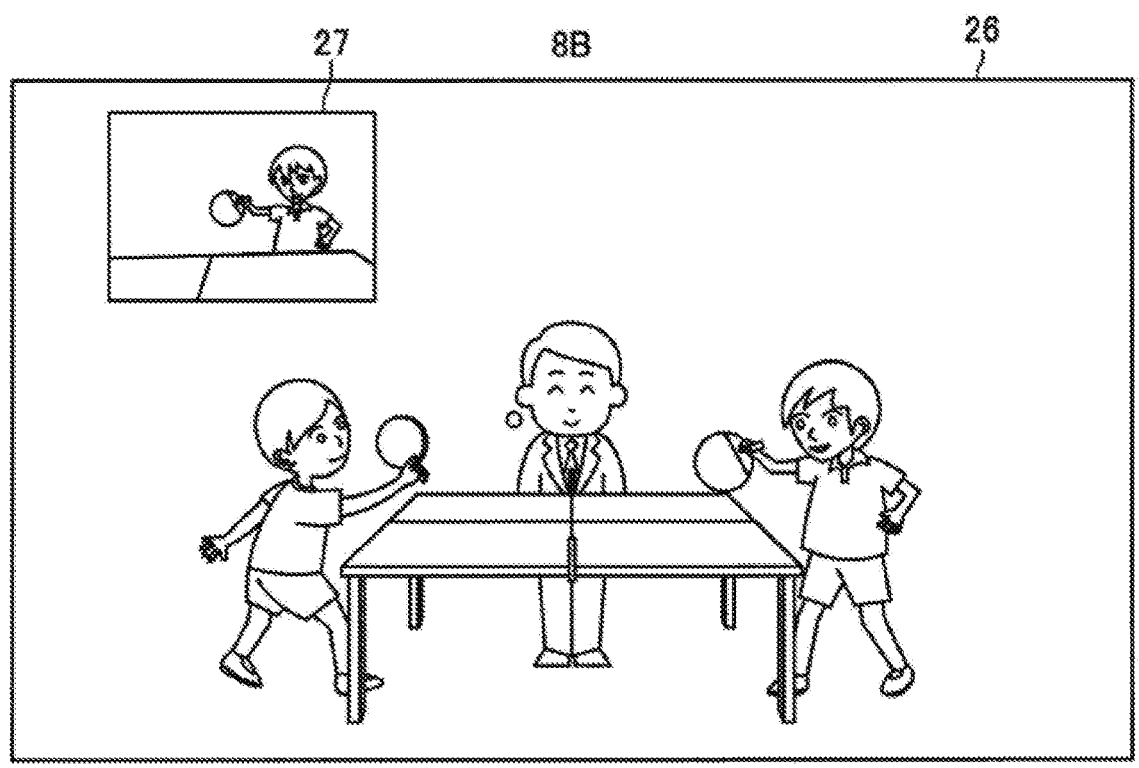

[FIG. 9]
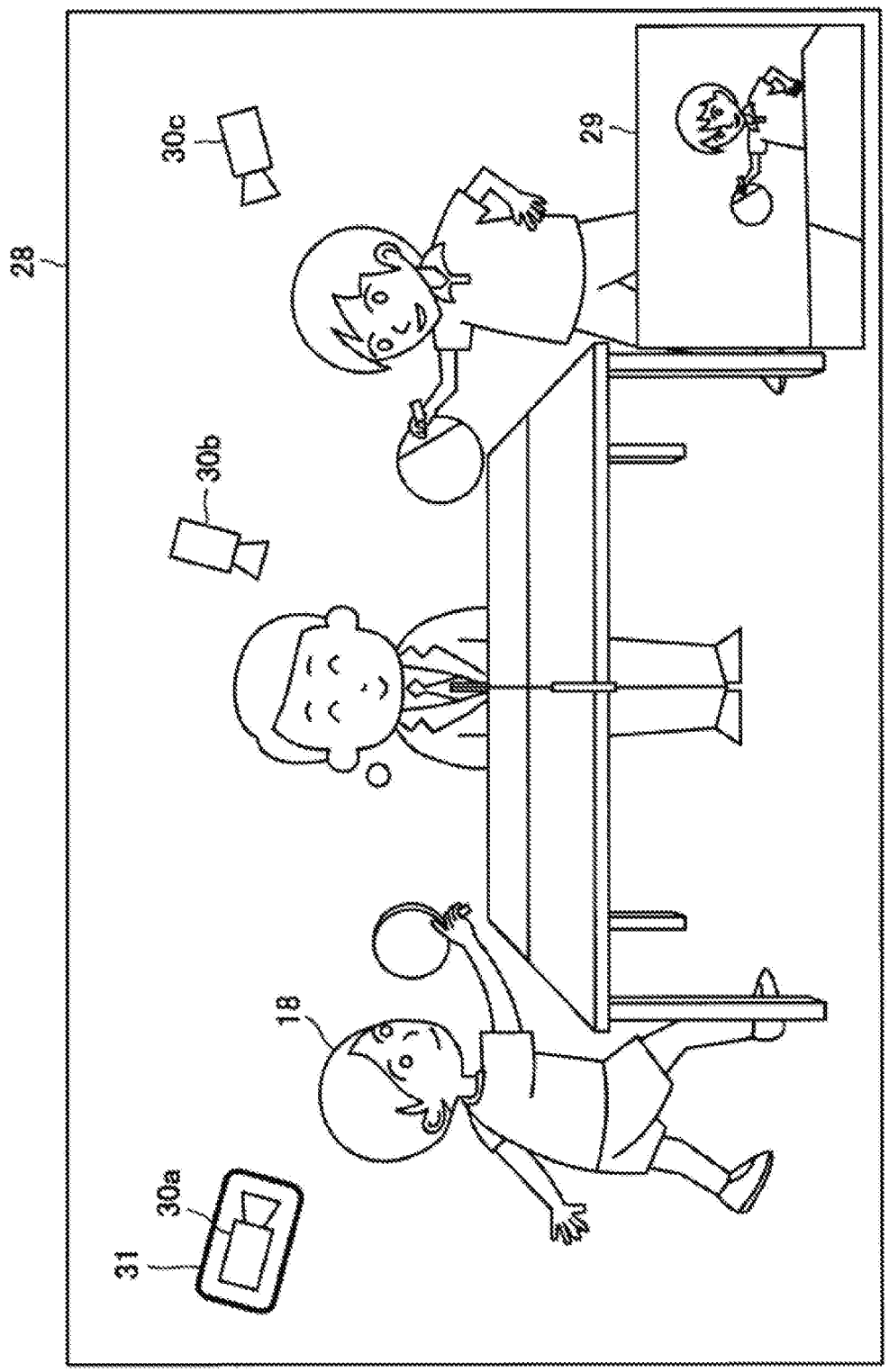

[FIG. 10]
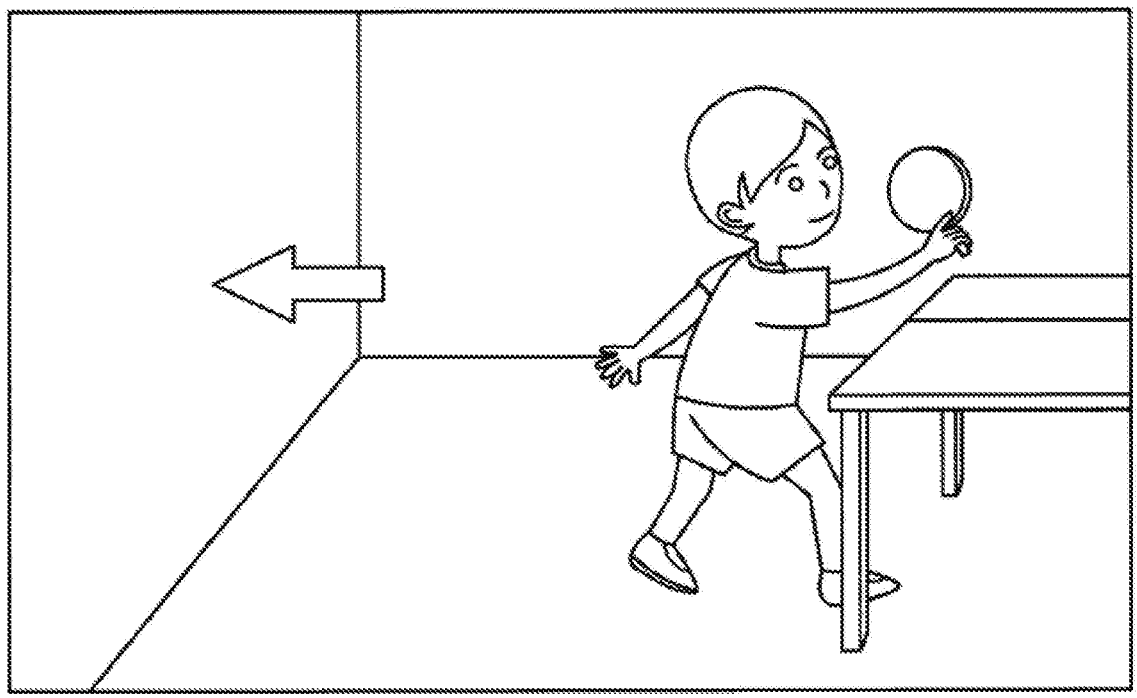
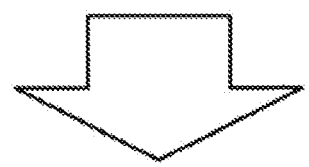
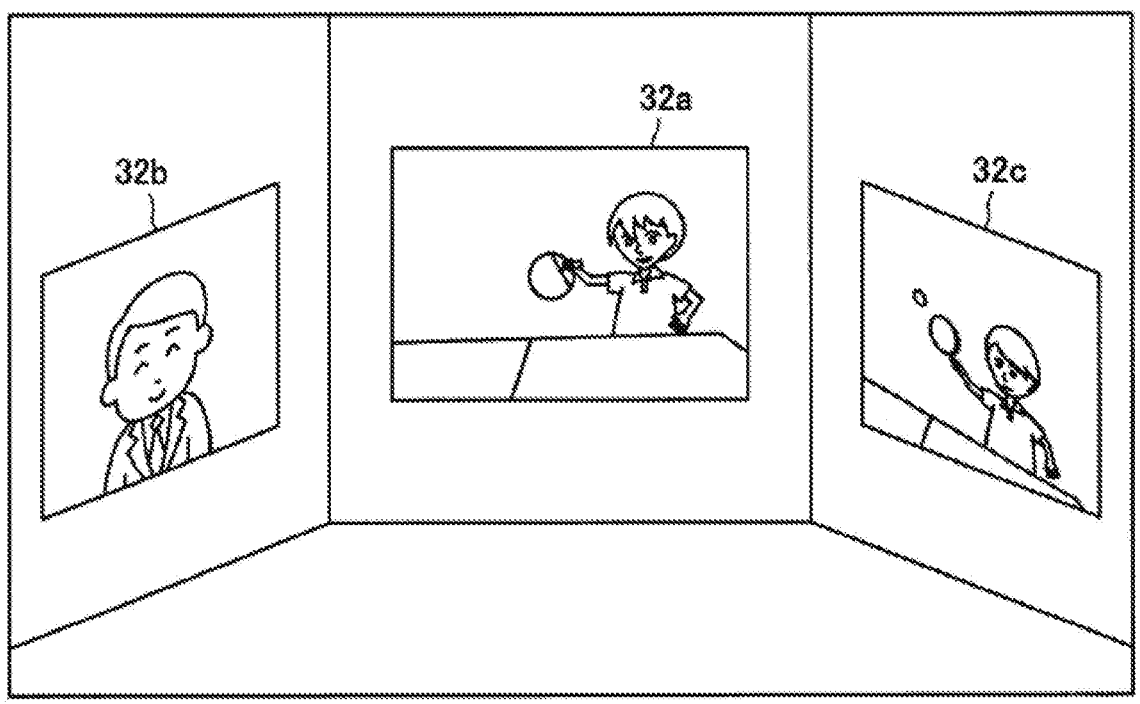

[FIG. 11]
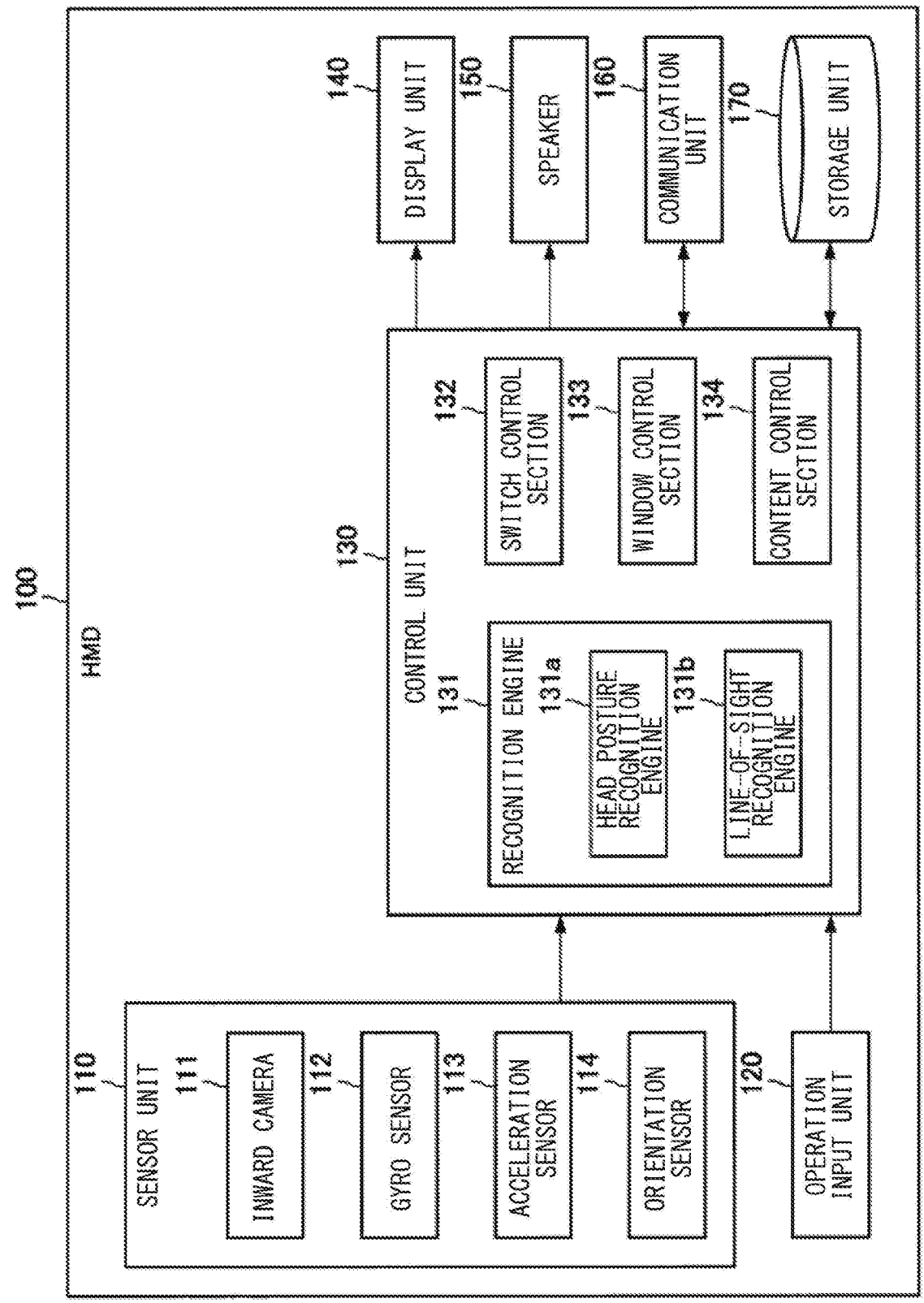

[FIG. 12]
12A
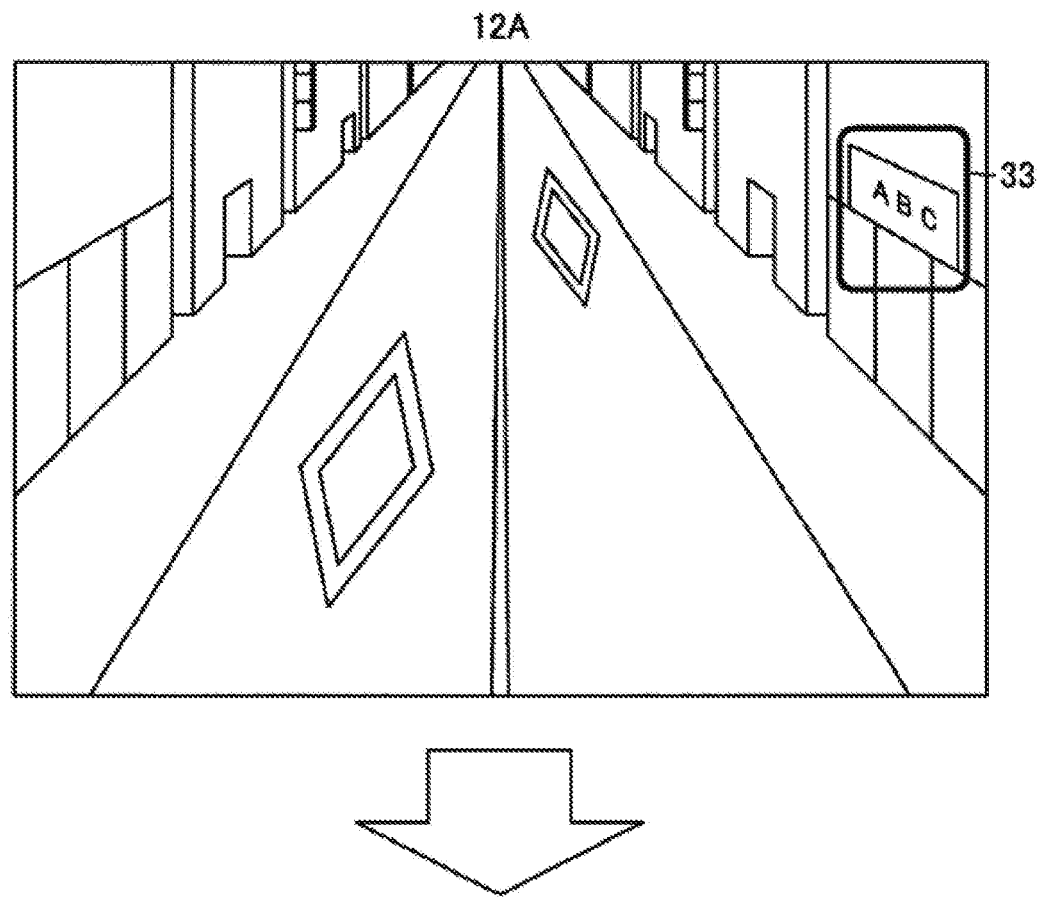
12B
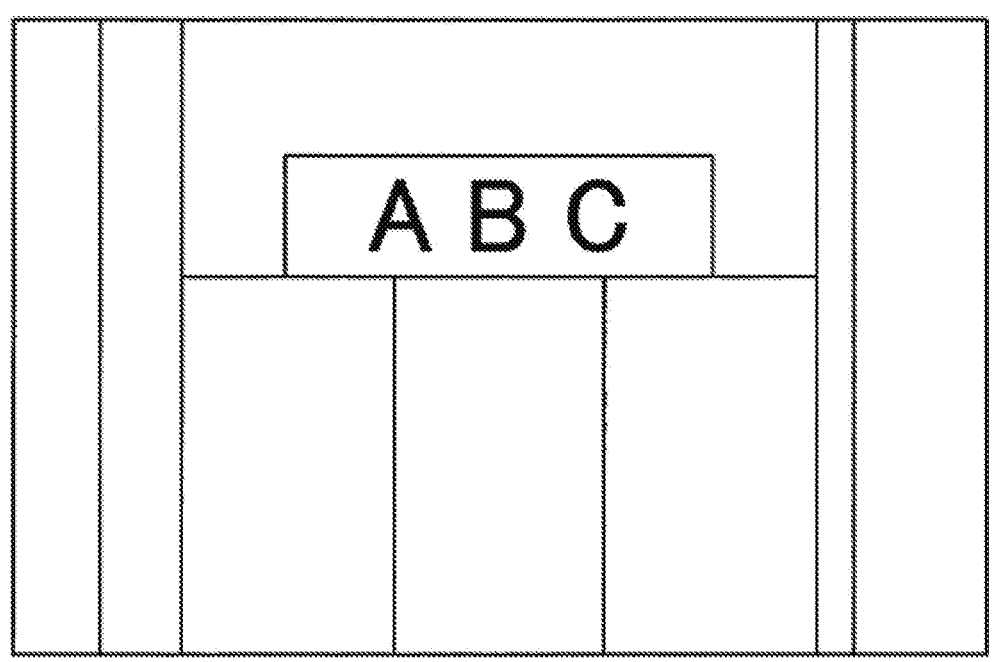

[FIG. 13]
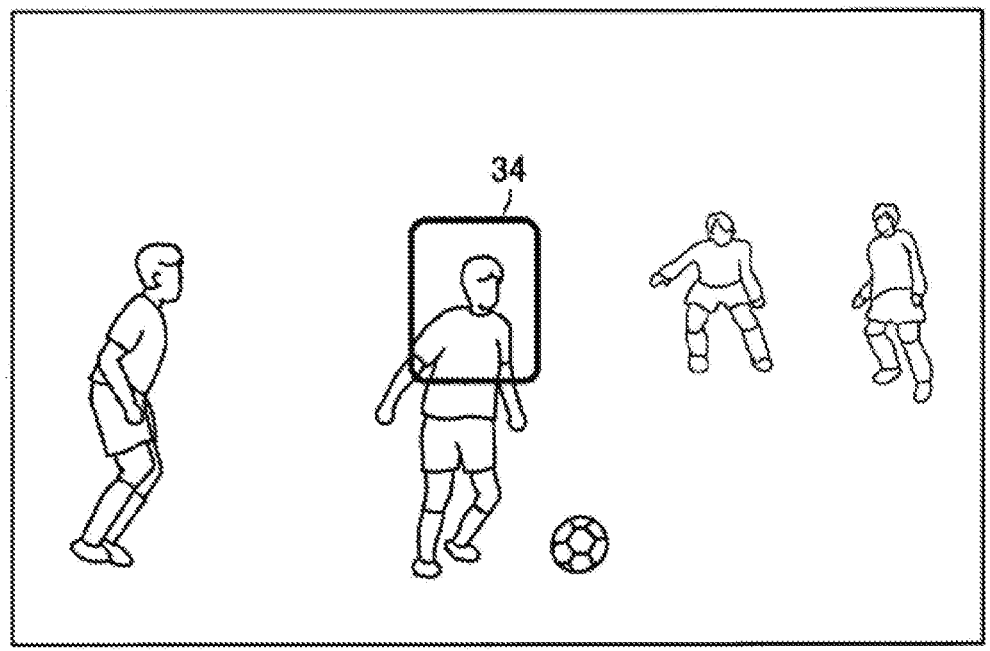
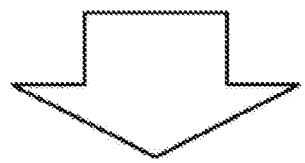
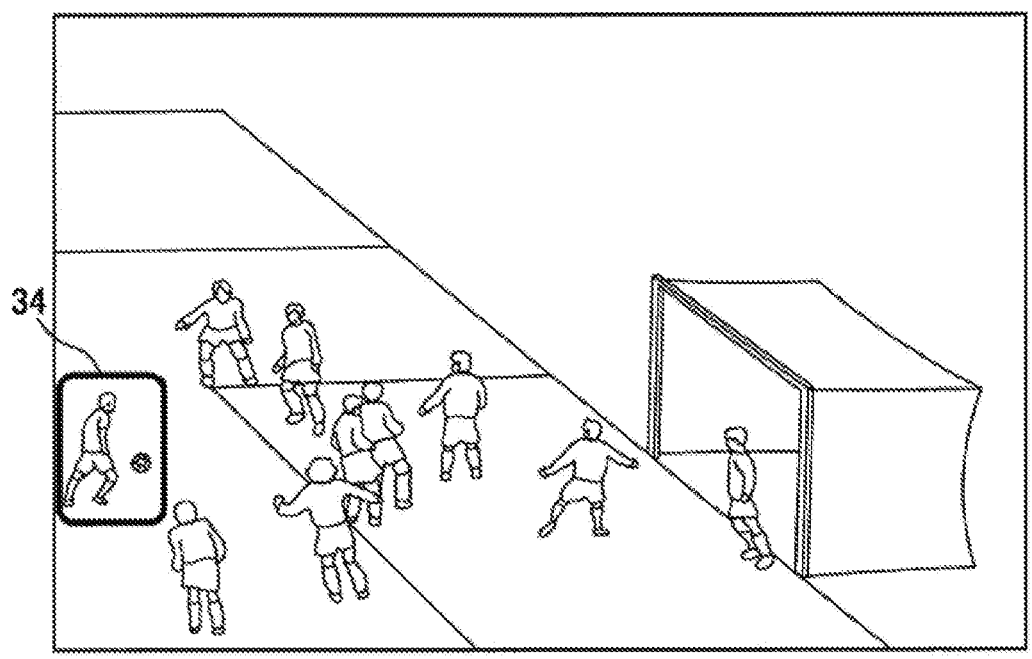

[ FIG. 14 ]
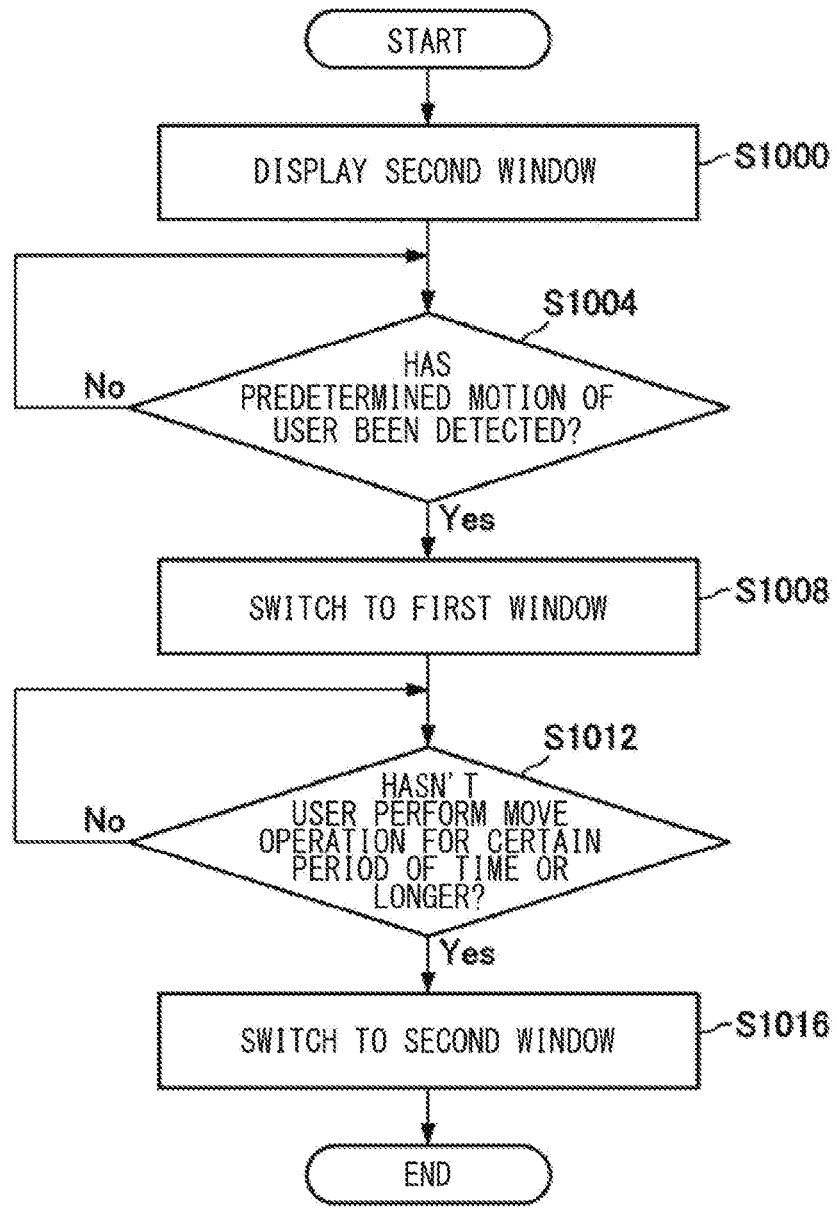

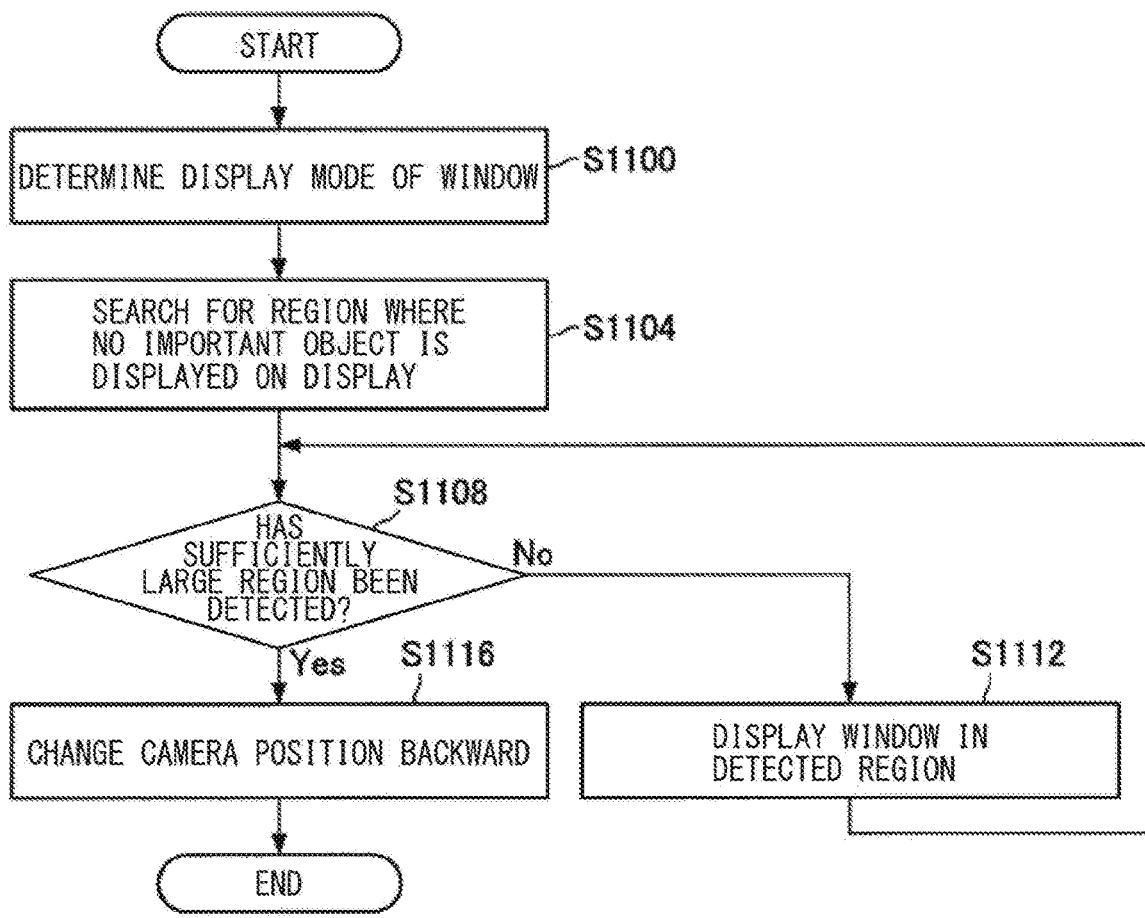
[FIG. 15]

[ FIG. 16 ]
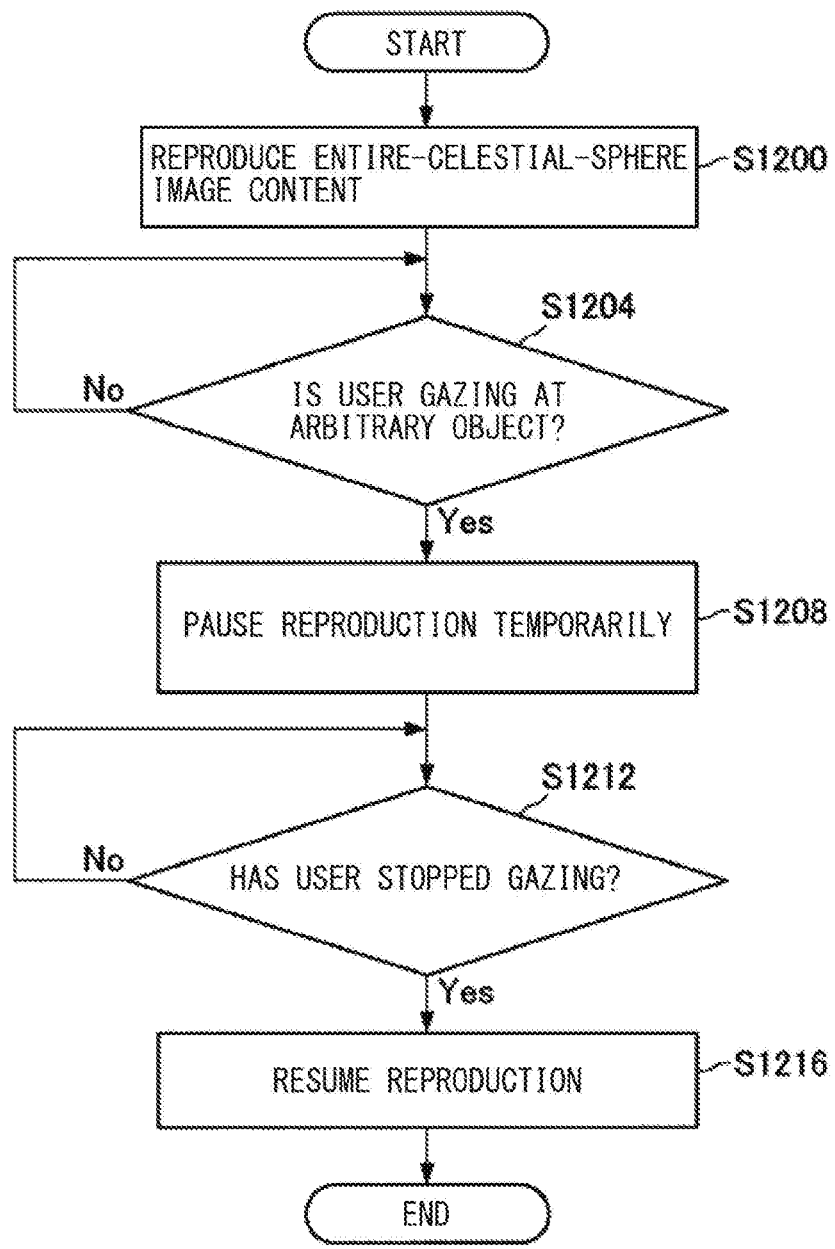

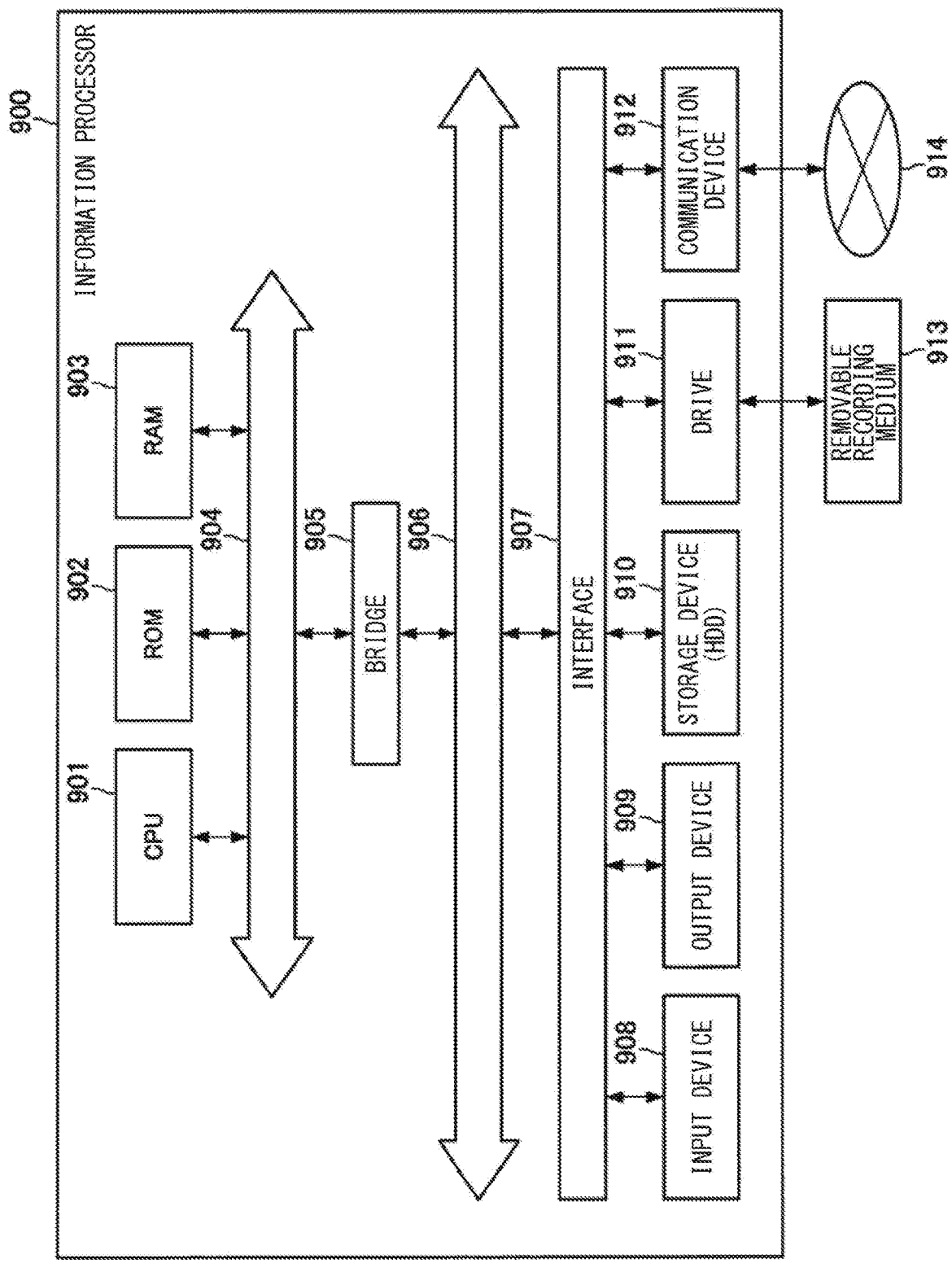
[FIG. 17]

[ FIG. 18 ]
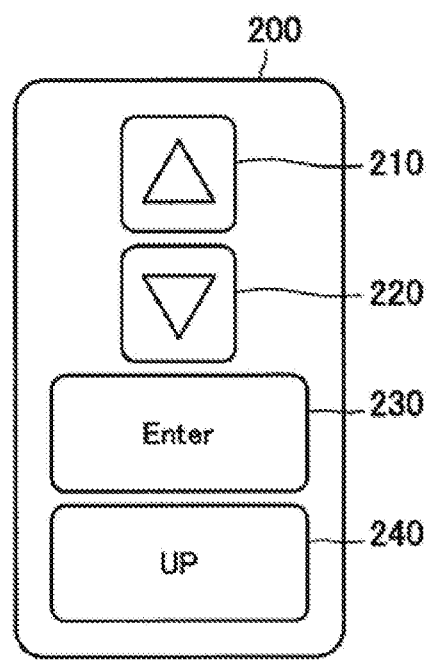

INFORMATION PROCESSOR, INFORMATION PROCESSING METHOD, AND PROGRAM

CROSS REFERENCE TO PRIOR APPLICATION

This application is a National Stage Patent Application of PCT International Patent Application No. PCT/JP2019/005205 (filed on Feb. 14, 2019) under 35 U.S.C. § 371, which claims priority to Japanese Patent Application No. 2018-066734 (filed on Mar. 30, 2018), which are all hereby incorporated by reference in their entirety.

TECHNICAL FIELD

The present disclosure relates to an information processor, an information processing method, and a program.

BACKGROUND ART

In recent years, various techniques regarding displaying image contents have been developed with the progress of filming techniques or information processing techniques. For example, PTL 1 listed below discloses a technique of switching between a first display control mode for performing display control of a first image of a viewpoint of a user and a second display control mode for performing display control of a second image filmed by the user.

CITATION LIST

Patent Literature

PTL 1: Japanese Unexamined Patent Application Publication No. 2014-115457

SUMMARY OF THE INVENTION

Problem to be Solved by the Invention

However, according to the technique, etc. of PTL 1, it has not been possible to adequately perform switching between a filmed image of a camerawork operated by a user and a filmed image of a camerawork operated by a subject other than the user.

Therefore, the present disclosure has been made in view of the above-described issue, and an object of the present disclosure is to provide an information processor, an information processing method, and a program which are new and improved and make it possible to more adequately perform switching between a filmed image of a camerawork operated by a user and a filmed image of a camerawork operated by a subject other than the user.

Means for Solving the Problem

According to the present disclosure, there is provided an information processor including: an acquisition unit that acquires information regarding a motion of a user; and a control unit that controls, on a basis of the information regarding the motion of the user, switching between a first display region corresponding to a first camerawork operated by the user and a second display region corresponding to a second camerawork operated by a subject other than the user.

In addition, according to the present disclosure, there is provided an information processing method executed by a computer, the method including: acquiring information regarding a motion of a user; and controlling, on a basis of the information regarding the motion of the user, switching between a first display region corresponding to a first camerawork operated by the user and a second display region corresponding to a second camerawork operated by a subject other than the user.

In addition, according to the present disclosure, there is provided a program that causes a computer to implement: acquiring information regarding a motion of a user; and controlling, on a basis of the information regarding the motion of the user, switching between a first display region corresponding to a first camerawork operated by the user and a second display region corresponding to a second camerawork operated by a subject other than the user.

Effect of the Invention

As described above, according to the present disclosure, it is possible to more adequately perform switching between a filmed image of a camerawork operated by a user and a filmed image of a camerawork operated by a subject other than the user.

It is to be noted that above-mentioned effects are not necessarily limitative; in addition to or in place of the above effects, there may be achieved any of the effects described in the present specification or other effects that may be grasped from the present specification.

BRIEF DESCRIPTION OF THE DRAWINGS

FIG. 1 illustrates an example of an HMD 100 according to the present embodiment.

FIG. 2 illustrates an example of a first camerawork operated by a user and a second camerawork operated by a subject other than the user.

FIG. 3 illustrates an example of a display mode of a window.

FIG. 4 illustrates an example of a display mode of windows.

FIG. 5 illustrates an example of a display mode of windows.

FIG. 6 illustrates an example of a display mode of windows.

FIG. 7 illustrates an example of display modes of windows.

FIG. 8 illustrates an example of display modes of windows.

FIG. 9 illustrates an example of a display mode of windows.

FIG. 10 illustrates an example of display modes of windows.

FIG. 11 is a block diagram illustrating functional configuration examples of the HMD 100 according to the present embodiment.

FIG. 12 illustrates an example of control of progress or a substance of an image content.

FIG. 13 illustrates an example of control of progress or a substance of an image content.

FIG. 14 is a flowchart illustrating an example of a processing flow related to switching between windows.

FIG. 15 is a flowchart illustrating an example of a processing flow related to control of windows.

FIG. 16 is a flowchart illustrating an example of a processing flow related to control of progress of an image content.

FIG. 17 is a block diagram illustrating a hardware configuration example of an information processor 900 that embodies the HMD 100 according to the present embodiment.

FIG. 18 illustrates an example of a controller 200.

MODES FOR CARRYING OUT THE INVENTION

Hereinafter, description is given in detail of preferred embodiments of the present disclosure with reference to the accompanying drawings. It is to be noted that, in the present specification and drawings, repeated description is omitted for components substantially having the same functional configuration by assigning the same reference numerals.

It is to be noted that description is given in the following order.
1. Background
2. Functional Overview
3. Function Configuration Example
4. Example of Processing Flow
5. Hardware Configuration Example
6. Remarks
7. Conclusion

1. Background

First, description is given of a background of the present disclosure.

For example, in a case where a user views an image content by using a TV, a head-mounted display (hereinafter, referred to as an "HMD"), or the like, user's desire may not be satisfied in some instances where only a filmed image of a camerawork operated by a creator is provided. For example, even when the user is interested in an object in a filmed image and is gazing at the object, the camerawork operated by the creator performs filming without taking the user's interest into account, thus leading to a situation where the user may not be able to view the object well in some cases (e.g., the object may deviate from an angle of view).

Meanwhile, when only a filmed image of a camerawork operated by the user is provided, which is achieved by a free viewpoint technique or the like, the user is not able to view a desired filmed image unless the user performs a move operation at all times (or frequently), which therefore imposes higher loads on the user and thus is not suitable for viewing for a longer period of time. In particular, the larger the space is in which a filming subject moves, the higher the loads on the user become, as in a case where the image content is a soccer relay, or the like. Therefore, it is required to adequately perform switching between the filmed image of the camerawork operated by the user and the filmed image of the camerawork operated by the creator.

However, as described above, according to the technique, etc. of PTL 1, it has not been possible to adequately perform switching between the filmed image of the camerawork operated by the user and the filmed image of the camerawork operated by the creator.

In light of the above circumstances, disclosers of the present application have reached the creation of the present disclosure. The present disclosure controls, on the basis of a motion of the user switching between a first window that displays a filmed image of a first camerawork operated by the user and a second window that displays a filmed image of a second camerawork operated by a subject other than the user. Hereinafter, description is given in detail of the present disclosure.

2. Functional Overview

The description has been given above of the background of the present disclosure. Next, description is given of a functional overview of the present disclosure.

The present disclosure is applicable to various apparatuses and systems; hereinafter, description is given, as an example, of a case where the present disclosure is applied to a shielded HMD 100 as illustrated in FIG. 1. The HMD 100 is an information processor that is worn on a head of the user and displays a filmed image on a display in front of the eyes. It is to be noted that the shape of the HMD 100 is not limited to the shape illustrated in FIG. 1. For example, the entire field of view of the user may not necessarily be covered.

The HMD 100 provides an image content in which an entire-celestial-sphere image is displayed (hereafter, referred to as an "entire-celestial-sphere image content"), or an image content in which a free-viewpoint image is displayed (hereafter, referred to as a "free-viewpoint image content"), etc. It is to be noted that an image content provided by the HMD 100 may be either a content provided in real time in parallel with filming or a content previously recorded. In addition, a substance of the image content provided by the HMD 100 is not particularly limited, and includes, for example, a game, a movie, a music video, and the like.

Then, the HMD 100 controls, on the basis of a predetermined motion of the user, switching between a first display region corresponding to the first camerawork operated by the user and a second display region corresponding to the second camerawork operated by a subject other than the user (e.g., a creator of an image content, etc.). It is to be noted that the image content provided to the user is not limited to an image in which an actual filming interval is imaged, but may be an image of a virtual space arbitrarily created in advance. In this case, a region of a portion of the virtual space provided to the user may also be regarded as a filmed image. That is, in the present disclosure, the first display region may be regarded as a display region indicating the filmed image of the first camerawork (a portion of a real space image or a portion of a virtual space image) operated by the user. Meanwhile, the second display region may be regarded as a display region displaying the filmed image of the second camerawork (a portion of the real space image or a portion of the virtual space image) operated by a subject other than the user. In the present disclosure, the display regions displaying these filmed images may be referred to as a first window and a second window, in some cases, for the purpose of convenience. It should be noted that, in the present disclosure, even in a case of occupying the entire screen of the HMD (field of view of the user), the above-described display region is also referred to as the first (second) window for the purpose of convenience. That is, it should be noted that the window, as used in the present disclosure, is not limited to a planar display region or a display region having a boundary visible by the user.

For example, suppose a case, as an example, where the HMD 100 provides a free-viewpoint image content related to a table tennis game. At this time, 2A of FIG. 2 illustrates a second camerawork 10 operated by a subject other than the user. In a case where the subject other than the user is a creator of the image content, the creator determines the second camerawork 10 to allow for filming of a more adequate image in accordance with game development. It is to be noted that the subject other than user is not limited to the creator of the image content. For example, the subject other than the user may be a user other than the user (e.g., another user watching a table tennis game, another user supporting an opponent player, or a user having a charismatic character such as an entertainer, etc.), and the second camerawork 10 may be synchronized with a viewpoint of the other user. In addition, the subject other than user may be image content software itself, and the image content software may analyze spatial meta information (e.g., information regarding a position of a player or a ball, etc.) to autonomously control the second camerawork 10. It is to be noted that, in a case where a free-viewpoint image content is provided, the second camerawork 10 (i.e., a position of the camera) is operated by a subject other than the user, such as the creator, but a substance of the filmed image (i.e., a direction or an angle of view in which the camera performs filming) may be controlled by operations of the user.

Meanwhile, 2B of FIG. 2 illustrates a first camerawork 11 operated by the user. The HMD 100 is provided with a camera (hereinafter, referred to as an "inward camera") installed in a mode allowing for filming eyeballs of the user, a gyro sensor, an acceleration sensor, or an orientation sensor, etc. Then, the HMD 100 analyzes various types of sensor information acquired by these sensors to thereby be able to recognize a posture of the head or a line of sight of the user wearing the HMD 100. Then, the user changes or moves the posture of the head or the line of sight while wearing the HMD 100 to thereby be able to change the first camerawork 11 (i.e., a viewpoint of the user) and to display a desired image on the display.

Then, on the basis of a predetermined motion of the user, the HMD 100 performs switching between the first window that displays the filmed image of the first camerawork 11 and the second window that displays the filmed image of the second camerawork 10. For example, in a case where a predetermined motion is performed by the user while a window 12 of either the first window or the second window is displayed on the entire display of the HMD 100 as illustrated in FIG. 3, the HMD 100 may perform switching to the other window.

In addition, the HMD 100 is able to perform switching between the first window and the second window in various modes other than that in FIG. 3. For example, as illustrated in FIG. 4, the HMD 100 may simultaneously provide the first window or the second window to the field of view of the user to perform switching between the first window and the second window in a case where a predetermined motion is performed by the user. More specifically, in a case where a predetermined motion is performed while displaying, on one window 13, another window 14 in a superimposed manner, the HMD 100 may perform switching between the first window and the second window. This enables the user to recognize presence of two types of windows and to perform switching between these windows as needed.

In addition, in a case of displaying, on one window 15 of either the first window or the second window, another window 16 in a superimposed manner as illustrated in FIG. 5, the HMD 100 may control a position, a size, a shape, or the like of the other window 16 to thereby display an image that is easier for the user to view. More specifically, the HMD 100 may control the position, the size, the shape, or the like of the window 16 not to be superimposed on an object (a player in the drawing) displayed in the window 15. This enables the user to compare the window 15 and the window 16 with each other more easily and to view the object more easily. In addition, the user does not miss an important scene (provided by the creator, etc.) displayed in the second window even while the first window is displayed which displays a desired filmed image. It is to be noted that window 16 not only may be displayed simply in a superimposed manner, but also may be displayed in such a mode as if the window 16 appears to be a virtual display installed in the world of the window 15 (e.g., a display position of the window 16 on the display may be coordinated with the field of view of the user, etc.).

In addition, so as not to be superimposed on a highly important object (hereinafter, referred to as an "important object") displayed in one window 17 of either the first window or the second window as illustrated in FIG. 6, the HMD 100 may control a position, a size, a shape, or the like of another window 23. It is to be noted that the important object may be regarded as an object having relatively high display priority in the window 17. More specifically, in a case where the important object in FIG. 6 corresponds to a player 18, a player 19, a ball 20, a ping-pong table 21, and a referee 22, the HMD 100 may determine the position, the size, the shape, or the like of the window 23 not to be superimposed on each of these important objects to display the window 23 in a superimposed manner. This enables the user to view the important objects more easily.

In addition, in a case where a window 24 to be displayed in a superimposed manner is superimposed halfway on an arbitrary object 25 (e.g., in a case where the window 24 is superimposed on a region, in the object 25, of a predetermined rate or more and a predetermined rate or less) as illustrated in 7A of FIG. 7, the HMD 100 may determine a position, a size, a shape, or the like of the window 24 to allow a large portion of the object 25 (e.g., a region, in the object 25, of a predetermined rate or more) to be hidden as illustrated in 7B to display the window 24 in a superimposed manner. In a case where the window 24 is superimposed halfway on the arbitrary object 25, the user may possibly feel discomfort; therefore, the above-described measure enables the HMD 100 to reduce the discomfort to be caused to the user.

In addition, in a case where one window 26 of either the first window or the second window does not have a sufficiently large region where another window 27 is displayable in a superimposed manner as illustrated in 8A of FIG. 8, the HMD 100 may secure a region (area) for displaying the window 27 by reducing a filmed image corresponding to the window 26 as illustrated in 8B. It is to be noted that the HMD 100 may widen an angle of view of the camera corresponding to the window 26 or may change the position of the camera corresponding to the window 26 backward, instead of reducing the filmed image corresponding to the window 26, as long as the HMD 100 is able to secure a sufficiently large region where the window 27 is displayable.

In addition, as illustrated in FIG. 9, the HMD 100 may display a plurality of objects 30 (objects 30a to 30c are illustrated in the drawing) illustrating respective cameras in one window 28 of either the first window or the second window. The user selects a desired object 30 from among the plurality of objects 30, thereby enabling the display to display a filmed image from a camera corresponding to the selected object 30. It is to be noted that a filmed image from the camera corresponding to the object 30 selected by the user may be displayed in one of the window 28 and a window 29. In addition, as illustrated in FIG. 9, the HMD 100 may add a predetermined mark 31 to the object 30 indicating a camera corresponding to the window 29 displayed in a superimposed manner. This enables the user to recognize a filming position of an image displayed in the window 29.

It is to be noted that the HMD 100 may display the plurality of objects 30 indicating the respective cameras in the window 29 displayed in a superimposed manner. In addition, the HMD 100 may add the predetermined mark 31 to the object 30 indicating a camera corresponding to the windows 28.

In addition, an image overlooking the entire venue (e.g., a table tennis game venue) (hereinafter, referred to as "bird's-eye view image") from above may be prepared, and an object indicating a camera may be displayed in the bird's-eye view image. The user selects a desired object from among objects in the bird's-eye view image to thereby enable the display to display a filmed image from the camera corresponding to the selected object.

It is to be noted that the display mode of the display described above is merely exemplary, and may be flexibly changed as appropriate.

Description is now given of a predetermined motion of the user that triggers the switching between the windows. Examples of the switching from a state in which the second window (window that displays a filmed image provided by the creator, etc.) is larger than the first window (window that displays a filmed image desired by the user) to a state in which the first window is larger than the second window includes: a motion in which the user stands up; a motion in which the user moves the neck; a motion in which the user lifts a predetermined controller; a motion in which the user presses a button of the predetermined controller; a motion in which the user continues to gaze at a specific filming subject for a certain period of time or longer; or a motion in which the user continues to gaze at the first window (or any of the objects 30 indicating the cameras in FIG. 9) for a certain period of time or longer. It is to be noted that the same holds true also for switching from a state in which the second window is displayed on the entire display to a state in which the first window is displayed on the entire display (in this case, the display before the switching displays only the second window, and thus the motion is not included in which the user continues to gaze at the first window for a certain period of time or longer).

Conversely, examples of the switching from the state in which the first window is larger than the second window to the state in which the second window is larger than the first window includes: a motion in which the user sits down; a motion in which the user moves the neck; a motion in which the user puts down a predetermined controller; a motion in which the user presses a button of the predetermined controller; a motion in which the user continues to gaze at a specific filming subject for a certain period of time or longer; a motion in which the user continues to gaze at the second window (or any of the objects 30 indicating the cameras in FIG. 9) for a certain period of time or longer, or the user not performing a move operation for a certain period of time or longer. It is to be noted that the same holds true also for switching from the state in which the first window is displayed on the entire display to the state in which the second window is displayed on the entire display (in this case, the display before the switching displays only the first window, and thus the motion is not included in which the user continues to gaze at the second window for a certain period of time or longer).

It is to be noted that the method for switching windows is not limited to those described above. For example, in a case where the user performs a motion of moving into a wall (in a case of moving in a direction indicated by an arrow in 10A) while the free-viewpoint image content is displayed on the display as illustrated in 10A of FIG. 10, transition may be performed to a space where a plurality of windows 32 (windows 32a to 32c are illustrated in the drawing) are displayed which indicate respective filmed images from a plurality of cameras as illustrated in 10B. The user then performs a motion of moving into one of the plurality of windows 32 (or a motion of continuing to gaze at one of the plurality of windows 32 for a certain period of time or longer, etc.) to thereby enable the display to display the desired window 32. In the free-viewpoint image content, the user may be able to move into (stuck into) a range which is not filmed by a camera in some cases. In such cases, a countermeasure has been taken such as darkening of the entire display, but this countermeasure may possibly cause the user to feel uncomfortable. In this regard, taking the above-described measure enables the HMD 100 to prevent the user from feeling uncomfortable due to the darkening or the like and to causes the user to more easily select a desired window.

In addition, the HMD 100 may also control progress or a substance of an image content on the basis of a motion of the user. For example, when the user continues to gaze at an arbitrary object in the filmed image for a certain period of time or longer, the HMD 100 is able to temporarily pause the progress of the image content or decrease the speed of the progress. The details thereof are described later.

3. Example of Functional Configuration

The description has been given above of the functional overview of the present disclosure. Consequently, description is given of functional configuration examples of the HMD 100 with reference to FIG. 11.

As illustrated in FIG. 11, the HMD 100 includes a sensor unit 110, an operation input unit 120, a control unit 130, a display unit 140, a speaker 150, a communication unit 160, and a storage unit 170.

(Sensor Unit 110)

The sensor unit 110 is a functional configuration functioning as an acquisition unit that acquires various types of sensor information regarding the user or a surrounding environment. For example, the sensor unit 110 includes an inward camera 111, a gyro sensor 112, an acceleration sensor 113, and an orientation sensor 114. It is to be noted that the sensor unit 110 may include other sensors including an outward camera, a microphone, a positioning sensor or a TOF (Time-of-Flight) sensor, etc. In addition, there may be a plurality of sensors for each type. In addition, each of these sensors may be provided on an external apparatus (or an external system) other than the HMD 100, and various types of sensor information may be acquired from the external apparatus. The sensor unit 110 provides the acquired various types of sensor information to the control unit 130.

(Inward Camera 111)

The inward camera 111 is a functional configuration including each of a lens system configured by an imaging lens, an aperture, a zoom lens, and a focus lens, etc.; a drive system that causes the lens system to perform a focus operation and a zoom operation; a solid-state imaging element array that performs photoelectric conversion of image light obtained by the lens system to generate an imaging signal; and the like. The solid-state imaging element array may be implemented, for example, by a CCD (Charge Coupled Device) sensor array or a CMOS (Complementary Metal Oxide Semiconductor) sensor array.

(Gyro Sensor 112)

The gyro sensor 112 is a functional configuration that is implemented by, for example, a 3-axis gyro sensor and detects an angular speed (rotational speed).

(Acceleration Sensor 113)

The acceleration sensor 113 is a functional configuration that is implemented by, for example, a 3-axis acceleration sensor (also referred to as a G sensor) and detects acceleration upon moving.

(Orientation Sensor 114)

The orientation sensor 114 is a functional configuration that is implemented by, for example, 3-axis geomagnetic sensor (compass) and detects an absolute direction (orientation).

(Operation Input Unit 120)

The operation input unit 120 is a functional configuration that receives an input by the user and also functions as an acquisition unit that acquires information regarding motions of the user. For example, the operation input unit 120 includes input means such as a mouse, a keyboard, a touch panel, a button, a switch, and a microphone, which are used by the user to perform various inputs. The operation input unit 120 provides an inputted substance to the control unit 130. It is to be noted that the input means included in the operation input unit 120 are not limited to those described above.

(Control Unit 130)

The control unit 130 is a functional configuration that comprehensively controls overall processing performed by the HMD 100. For example, the control unit 130 generates control information to thereby be able to activate and deactivate each of the functional configurations including the display unit 140 or the speaker 150, etc. It is to be noted that a control substance of the control unit 130 is not limited to those described above. For example, the control unit 130 may control processing typically performed by any information processor including the HMD 100. In the present embodiment, the control unit 130 includes a recognition engine 131, a switch control section 132, a window control section 133, and a content control section 134.

(Recognition Engine 131)

The recognition engine 131 is a functional configuration that recognizes various circumstances of the user or the surroundings using the various types of sensor information acquired by the sensor unit 110. More specifically, the recognition engine 131 includes a head posture recognition engine 131a and a line-of-sight recognition engine 131b. It is to be noted that the recognition engine 131 may be provided with another recognition engine including a Depth recognition engine, a SLAM (Simultaneous Localization and Mapping) recognition engine, a sound recognition engine, a position recognition engine, or a behavioral-recognition engine, etc.

(Head Posture Recognition Engine 131a)

The head posture recognition engine 131 is a functional configuration that recognizes a posture of the head of the user (including an orientation or an inclination of the face with respect to the body) using the various types of sensor information acquired by the sensor unit 110. For example, the head posture recognition engine 131a may analyze at least one of gyroscopic information acquired by the gyro sensor 112, acceleration information acquired by the acceleration sensor 113, or orientation information acquired by the orientation sensor 114 to recognize the posture of the head of the user. It is to be noted that a generally known algorithm may be used as a recognition algorithm of the head posture; no particular limitation is made in the present embodiment.

(Line-of-Sight Recognition Engine 131b)

The line-of-sight recognition engine 131b is a functional configuration that detects a line of sight of the user using the various types of sensor information acquired by the sensor unit 110. For example, the line-of-sight recognition engine 131b analyzes filmed images of the eyes of the user acquired by the inward camera 111 to recognize a direction of the line of sight of the user. It is to be noted that an algorithm of the detection of the line of sight is not particularly limited, but the line-of-sight recognition engine 131b may implement the detection of the line of sight on the basis of, for example, a positional relationship between the inner corner of the eye and the iris or a positional relationship between corneal reflex (such as a Purkinje image) and the pupil. In addition, the line-of-sight recognition engine 131b may regard the front of the HMD 100 as a line-of-sight direction.

(Switch Control Section 132)

The switch control section 132 is a functional configuration that controls switching between the windows. More specifically, in a case where the above-described recognition engine 131 analyzes the various types of sensor information to thereby detect a predetermined motion of the user, or in a case where a predetermined input is performed from the operation input unit 120, the switch control section 132 performs switching between the first window that displays the filmed image of the first camerawork operated by the user and the second window that displays the filmed image of the second camerawork operated by a subject other than the user (e.g., a creator of an image content, etc.). It is to be noted that the example of the predetermined motion of the user that triggers the switching between the windows is as described above. The switch control section 132 generates control information for notifying that switching between the windows is to be performed, and provides the generated control information to the window control section 133.

(Window Control Section 133)

The window control section 133 is a functional configuration that controls a window displayed on the display. More specifically, in a case where the switch control section 132 provides the control information for notifying that switching between the windows is to be performed, the window control section 133 determines, for example, which mode of the display modes described above with reference to FIGS. 3 to 8 is adopted to display the window. The method for determining the display mode of the window is not particularly limited. For example, the display mode of the window may be predetermined, or may be determined on the basis of a user input, etc.

Then, the window control section 133 performs various types of processing for implementing the determined display mode. For example, in a case where the display mode of the window is as illustrated in FIG. 5, the window control section 133 recognizes an object (a player in the drawing) displayed in the window 15 by predetermined image analysis processing or the like, and determines the position, the size, the shape, or the like of the window 16 not to be superimposed on the object. Then, the window control section 133 generates control information on the basis of the determination, and provides the generated control information to the display unit 140 to thereby implement the display mode of FIG. 5. It is to be noted that examples of the shape of the window 16 include a polygon including a square, a circle including an ellipse, or any other shape (e.g., a star shape, etc.).

In addition, in a case where the display mode of the window is as illustrated in FIG. 6, the window control section 133 recognizes presence or absence of the display of an important object and the display position thereof in the window 17 by a predetermined image analysis processing, or the like. For example, the window control section 133 extracts a feature amount of each object displayed in the window 17, and compares the extracted feature amount with a feature amount of the important object extracted in advance to thereby recognize the presence or absence of the display of the important object and the display position thereof. The window control section 133 then determines the position, the size, the shape, or the like of the window 23 not to be superimposed on the important object. It is to be noted that the method for determining the important object is not particularly limited. For example, the important object may be predetermined or may be an object gazed at by the user or an object specified by the user. In addition, the important object may refer to only a portion of a certain object rather than the entire certain object.

In addition, in a case where the display mode of the window is as illustrated in FIG. 7, the window control section 133 confirms whether or not the window 24 is superimposed halfway on an arbitrary object 25 by predetermined image analysis processing, or the like. More specifically, the window control section 133 confirms whether or not the window 24 is superimposed on a region, in the object 25, of a predetermined rate or more and a predetermined rate or less. In a case where the window 24 is superimposed halfway on the arbitrary object 25, the window control section 133 determines the position, the size, the shape, or the like of the window 24 to allow the large portion of the object 25 to be hidden. More specifically, the window control section 133 determines the position, the size, the shape, or the like of the window 24 to allow a region, in the object 25, of a predetermined rate or more to be hidden. It is to be noted that a portion, of the object 25, that does not fit in the window 24 may be subjected to a blurring process or may be deleted.

In addition, in a case where the display mode of the window is as illustrated in FIG. 8, the window control section 133 searches for a sufficiently large region, in the window 26, where an object (which refers to an important object, etc., excluding a background, etc.) is not displayed and the window 27 is displayable in a superimposed manner. More specifically, the window control section 133 searches for a region, in the window 26, having an area of a predetermined value or higher where an object is not displayed and the window 27 is displayable in a superimposed manner. In a case where such a region is not present, the window control section 133 reduces the filmed image corresponding to the window 26 to thereby secure a region for displaying the window 27. It is to be noted that, as described above, measures other than reducing the filmed image may be taken, as long as the region for displaying the window 27 is able to be secured.

It is to be noted that the control substance of the window by the window control section 133 is not limited to those described above. For example, a plurality of the above-described control substances may be combined.

In addition, in a case where the windows are displayed in a superimposed manner, the user may have difficulty in recognizing a boundary between the windows in some cases. Therefore, the window control section 133 may blur a surrounding region of the window to be displayed in a superimposed manner, may lower luminance of the surrounding region of the window, or may provide a frame to the window to clarify the boundary between the window.

(Content Control Section 134)

The content control section 134 is a functional configuration that controls progress or a substance of an image content on the basis of motions of the user. More specifically, in a case where the above-described recognition engine 131 analyzes various types of sensor information to thereby detect a predetermined motion of the user, or in a case where the user performs a motion of making a predetermined input from the operation input unit 120, the content control section 134 changes the progress or the substance of the image content.

To describe the change in the progress of the content more specifically, the content control section 134 changes various parameters to thereby increase or decrease the speed of the progress of the image content, pause the image content, or the like.

For example, suppose, in a case where a user wearing the HMD 100 views a recorded town-walking content which enables the user to stroll a town while viewing an entire-celestial-sphere image of the town, that the recognition engine 131 recognizes that the user is gazing at a region 33 corresponding to an object (a sign in the drawing) in the filmed image, as illustrated in 12A of FIG. 12. In this case, the user is considered to be interested in the object corresponding to the region 33; thus, for example, at a timing when the town-walking content progresses and the object corresponding to the region 33 is displayed near the middle of the display as illustrated in 12B, the content control section 134 may temporarily pause the reproduction or decrease a reproduction speed. This enables the user to view the object better.

In addition, in a case where the recognition engine 131 recognizes that the user is looking around with vigorous movement of the neck, the content control section 134 may determine that the user is searching for something in the filmed image and may pause the reproduction or decrease the reproduction speed. In addition, in a case where the recognition engine 131 recognizes that the user is performing an unusual motion (e.g., a motion of removing the HMD 100, etc.) as the viewing motion, the content control section 134 may temporarily pause the reproduction in the determination that the user is pausing the viewing of the image content. In addition, in a case where a plurality of users are viewing the image content synchronously and some of the users perform the above-described motion, the image content viewed by all of the users may be temporarily paused or the reproduction speed may be decreased.

In addition, in a case where the user stops the above-described motion, or in a case where a certain period of time or longer elapses after the temporary pause or the like of the reproduction is performed, the content control section 134 may resume the reproduction or return the reproduction speed to the normal speed.

To describe the change in the substance of the image content more specifically, for example, suppose, in a case where a user wearing the HMD 100 views a free-viewpoint sport content, that the recognition engine 131 recognizes that the user is gazing at a region 34 corresponding to an object (a player in the drawing) in the filmed image, as illustrated in 13A of FIG. 13. In this case, the user is considered to be interested in the object corresponding to the region 34, and thus, for example, the content control section 134 may determine various parameters (e.g., angle of view, viewpoint, enlargement or reduction factor, etc.) to prevent the object from deviating from the angle of view, as illustrated in FIG. 13B. This enables the user to continue to view the object better.

In addition, suppose, in a case of viewing the free-viewpoint town-walking content, that the recognition engine 131 recognizes that the user is gazing at a region corresponding to an object in the filmed image. In this instance, the content control section 134 may temporarily pause moving the viewpoint; may move the viewpoint to have a better view of the object; or, in a case where the object disappears or changes over time, may delay timing of the disappearance or the change. In addition, in a case where the recognition engine 131 recognizes that the user has become tired of the image content, as in small movement of the neck, etc., the content control section 134 may move the viewpoint.

In addition, the content control section 134 may control the substance, etc. of an event occurring in the image content. For example, in a case where a user wearing the HMD 100 plays a free-viewpoint game content, the content control section 134 may cause a predetermined event to occur, by using, as a trigger, recognition of the recognition engine 131 that the user is gazing at a region or in a specific direction corresponding to the object in the image. In addition, in a case where the user continues to gaze in the opposite direction, the content control section 134 may delay the occurrence of the predetermined event or may cause another event to occur. In addition, the content control section 134 may determine an event (or a subsequent story) to be caused to occur on the basis of which object to be selected as a tracking target by the user from among a plurality of moving objects.

It is to be noted that those described above are merely exemplary, and the control substance of the image content may be appropriately changed. For example, the content control section 134 may control the progress or the substance of the image content on the basis of utterance, gesture, or the like of the user. In addition, for example, during a time when switching is made from the first window (window that displays a filmed image desired by the user) to the second window (window that displays a filmed image provided by the creator, etc.), the content control section 134 may provide, as a highlighted scene, a scene that the user has missed due to the display of the first window. In addition, in a case where the user wears the HMD 100 again after removing the HMD 100 once, the content control section 134 may rewind the content a little (rewind the content by a predetermined period of time) from the temporarily paused scene at a time when the user has removed the HMD 100 to resume reproducing the scene.

In addition, when the entire-celestial-sphere image content is filmed, rotation of the camera also causes a filmed image to be rotated. Because of a possibility that the user may feel uncomfortable when viewing such a rotated filmed image, the content control section 134 may provide the user with an image having undergone correction and fixing of the rotation of the filmed image by being subjected to predetermined image processing. The method for correcting the rotation of the filmed image is not particularly limited.

(Display Unit 140)

The display unit 140 is a display or the like, and is a functional configuration that displays various types of information under the control of the control unit 130. For example, the display unit 140 is switched by the switch control section 132 of the control unit 130, and displays the first window or the second window in a mode specified by the window control section 133. In addition, the display unit 140 displays, in the respective windows, image contents of which the progress or the substance is controlled by the content control section 134.

(Speaker 150)

The speaker 150 is a functional configuration that reproduces a sound signal under the control of the control unit 130.

(Communication Unit 160)

The communication unit 160 is a functional configuration that transmits and receives data to and from another device by wire or wirelessly. The communication unit 160 wirelessly communicates with an external apparatus directly or via a network access point, for example, in a method such as a wired LAN (Local Area Network), a wireless LAN, Wi-Fi (Wireless Fidelity, registered trademark), infrared communication, Bluetooth (registered trademark), or short-range or non-contact communication.

(Storage Unit 170)

The storage unit 170 is a functional configuration that stores programs for the above-described control unit 130 to execute each of the functions, parameters, image data, or the like. For example, the storage unit 170 stores image data or the like related to an image content displayed by the display unit 140.

The description has been given above of the functional configuration examples of the HMD 100. It is to be noted that the functional configurations described above with reference to FIG. 11 are merely exemplary, and the functional configurations of the HMD 100 are not limited to such examples. For example, the HMD 100 may not necessarily include all of the functional configurations illustrated in FIG. 11. In addition, the functional configurations of the HMD 100 may be flexibly modified in accordance with specifications and operations.

4. Example of Processing Flow

The description has been given above of the functional configuration examples of the HMD 100. Consequently, description is given of examples of processing flows of the HMD 100.

(Processing Flow Related to Switching Between Window)

First, description is given of a processing flow related to switching between windows by the HMD 100 with reference to FIG. 14.

Suppose, in step S1000, that the display unit 140 of the HMD 100 displays the second window that displays a filmed image of the second camerawork operated by the creator. In step S1004, in a case where the recognition engine 131 detects a predetermined motion of the user on the basis of various types of sensor information from the sensor unit 110 (step S1004/Yes), the switch control section 132 performs, in step S1008, switching to the first window that displays the filmed image of the first camerawork operated by the user. Here, the switch control section 132 may switch the entire display to the first window, or may perform switching to a display that displays the first window and the second window in a manner superimposed on the first window.

In a case where the recognition engine 131 recognizes, in step S1012, that the user has not performed a move operation for a certain period of time or longer, on the basis of the various types of sensor information from the sensor unit 110 (step S1012/Yes), the switch control section 132 performs switching to the second window in step S1016. Similarly also to those described above, the switch control section 132 may switch the entire display to the second window, or may perform switching to a display that displays the second window and the first window in a manner superimposed on the second window. It is to be noted that the processing flow illustrated in FIG. 14 is assumed to be repeatedly performed while the image content is being activated.

It is to be noted that the processing flow related to the switching between the windows is not limited to the above-described processing flow. For example, in step S1004, the switch control section 132 may perform switching between the windows not only in a case where the recognition engine 131 detects a predetermined motion of the user, but also in cases such as a case where the user performs a predetermined input from the operation input unit 120. In addition, the flowchart may be changed as appropriate.

(Processing Flow Related to Window Control)

Subsequently, description is given of a processing flow related to window control by the HMD 100 with reference to FIG. 15. More specifically, FIG. 15 illustrates a processing flow related to display control of another window displayed in a superimposed manner in a case of displaying, on one window of either the first window or the second window, the other window in a superimposed manner. The processing flow may be executed, for example, upon switching between the windows in step S1008 or step S1016 of FIG. 14.

In step S1100, the window control section 133 of the HMD 100 determines a display mode of the windows. More specifically, the window control section 133 determines to display, on one window of either the first window or the second window, another window in a superimposed manner. In step S1104, the window control section 133 searches for a region where no important object is displayed on the display.

Then, in a case where the window control section 133 is unable to detect a sufficiently large region (region having an area of a predetermined value or higher) where no important object is displayed on the display (step S1108/No), the window control section 133 changes the position of the camera correspond to the larger window (e.g., the window 26 in FIG. 8) backward in step S1112. In a case where this enables the window control section 133 to detect a sufficiently large region (region having an area of a predetermined value or higher) (step S1108/Yes), the window control section 133 generates control information to display a window in a superimposed manner on the detected region, and provides the generated control information to the display unit 140 to thereby cause the display unit 140 to display the window in the detected region in a superimposed manner in step S1116.

It is to be noted that the processing flow related to the window control is not limited to those described above. For example, in step S1112, the window control section 133 may perform measures such as reducing the filmed image corresponding to the larger window, instead of changing the position of the camera corresponding to the larger window backward, to thereby secure a sufficiently large region. In addition, the flowchart may be changed as appropriate.

(Process Flow Related to Control of Progress of Image Content)

Consequently, description is given of a processing flow related to the control of progress of an image content performed by the HMD 100 with reference to FIG. 16.

Suppose, in step S1200, that the content control section 134 of the HMD 100 reproduces an entire-celestial-sphere image content. In a case where, in step S1204, the recognition engine 131 detects that the user is gazing at an arbitrary object in the filmed image on the basis of the various types of sensor information from the sensor unit 110 (step S1204/Yes), the content control section 134 temporarily pauses the reproduction of the entire-celestial-sphere image content at step S1208.

In a case where, in step S1212, the recognition engine 131 detects that the user has stopped gazing at the object (step S1212/Yes), the content control section 134 resumes reproducing the entire-celestial-sphere image content in step S1216.

It is to be noted that the processing flow related to the control of the progress of the image content is not limited to those described above. For example, in step S1208, the content control section 134 may decrease the reproduction speed of the entire-celestial-sphere image content. In addition, the content control section 134 may control not only the progress of the image content but also the substance of the image content, on the basis of the motion of the user.

In addition, the steps in the flowcharts illustrated in FIGS. 14 to 16 may not necessarily be processed in time series in the described order. That is, the steps in the flowchart either may be processed in an order different from the described order, or may be processed in parallel.

5. Hardware Configuration Example

The description has been given above of the example of the processing flow of the HMD 100. Subsequently, description is given of the hardware configuration example of the HMD 100. The various types of processing described above are implemented by cooperation between software and hardware described below.

FIG. 17 is a block diagram illustrating a hardware configuration example of an information processor 900 that embodies the HMD 100. The information processor 900 includes a CPU (Central Processing Unit) 901, a ROM (Read Only Memory) 902, a RAM (Random Access Memory) 903, a host bus 904, a bridge 905, an external bus 906, an interface 907, an input device 908, an output device 909, an storage device (HDD) 910, a drive 911, and a communication device 912.

The CPU 901 functions as an arithmetic processing device and a control device, and controls overall operations of the information processor 900 in accordance with various programs. In addition, the CPU 901 may be a microprocessor. The ROM 902 stores programs to be used by the CPU 901, arithmetic parameters, and the like. The RAM 903 temporarily stores programs to be used in execution by the CPU 901, parameters that vary appropriately in the execution, and the like. These components are coupled mutually by a host bus 904 configured by a CPU bus, etc. Cooperation among the CPU 901, the ROM 902 and the RAM 903 implements the functions of the control unit 130.

The host bus 904 is coupled to the external bus 906 such as a PCI (Peripheral Component Interconnect/Interface) bus via the bridge 905. It is to be noted that the host bus 904, the bridge 905, and the external bus 906 may not necessarily be configured separately; these functions may be implemented in one bus.

The input device 908 functions as the operation input unit 120 for the user to input information, such as a mouse, a keyboard, a touch panel, a button, a microphone, a switch, and a lever, or as the sensor unit 110 to input various types of sensor information, and is configured by an input control circuit, or the like that generates an input signal on the basis of the input and outputs the generated input signal to the CPU 901.

The output device 909 includes, for example, a display device such as a CRT (Cathode Ray Tube) display device, a liquid crystal display (LCD) device, an OLED (Organic Light Emitting Diode) device, and a lamp. Further, the output device 909 includes a sound output device such as a speaker and a headphone. The output device 909 displays various types of information such as image data, in images or texts. Meanwhile, the sound output device converts sound data, etc. into sound and outputs the sound. The output device 909 implements the functions of the display unit 140 or the speaker 150.

The storage device 910 is a device for storing data and configured as an example of the storage unit 170. The storage device 910 may include a storage medium, a recording device that records data on the storage medium, a reading device that reads the data from the storage medium, and a deleting device that deletes the data recorded on the storage medium. The storage device 910 is configured by, for example, an HDD (Hard Disk Drive). The storage device 910 drives a hard disk, and stores programs to be executed by the CPU 901 and various types of data.

The drive 911 is a reader/writer for the storage medium, and is built in or externally attached to the information processor 900. The drive 911 reads information recorded in an attached removable recording medium 913 such as a magnetic disk, an optical disk, a magneto-optical disk, or a semiconductor memory, and outputs the read information to the RAM 903. In addition, the drive 911 is also able to write information into the removable recording medium 913.

The communication device 912 is a communication interface configured by, for example, a communication device, etc. for being coupled to a communication network 914. The communication device 912 implements the functions of the communication unit 160.

It is to be noted that the hardware configuration of the information processor 900 is not limited to the configuration illustrated in FIG. 17. For example, the information processor 900 may not include the communication device 912 in a case of communicating via a coupled external communication device. In addition, the communication device 912 may be configured to allow for communication by a plurality of communication methods. In addition, for example, some or all of the configuration illustrated in FIG. 17 may be implemented by one or two or more ICs (Integrated Circuits).

6. Remarks

The description has been given above of the hardware configuration example of the HMD 100. Consequently, description is given, with reference to FIG. 18, of a specific example of a controller 200 that is usable in the present embodiment. For example, the user is able to control switching, etc. between the first window and the second window using the controller 200.

The controller 200 is a small-sized controller that is graspable by a user with one hand, and includes an upward button 210, a downward button 220, an Enter button 230, and an UP button 240 as illustrated in FIG. 18.
(Upward Button 210 and Downward Button 220)

The upward button 210 or the downward button 220 are each a button for selecting a window of a switching destination. For example, in a case where the objects 30 indicating the cameras in FIG. 9 are displayed on the display, the user is able to select each of the objects 30 in a forward direction or a reverse direction (e.g., is able to move focus) by pressing the upward button 210 or the downward button 220.
(Enter Button 230)

The Enter button 230 is a button for determining a window of a switching destination and executing the switching. For example, the user determines a window of the switching destination to execute the switching by pressing the Enter button 230 while selecting the window of the switching destination using the upward button 210 or the downward button 220 (e.g., while the object 30 indicating a desired camera is focused).
(Up Button 240)

The UP button 240 is a button for moving to a bird's-eye view image. For example, the user presses the UP button 240 to thereby be able to display an image overlooking the entire venue (e.g., venue of table tennis games, etc.) of the image content from above. In addition, this bird's-eye view image displays a plurality of objects indicating respective cameras; the user is able to select and determine a window of switching destination and to execute the switching between windows by pressing each of the buttons described above.

It is to be noted that those described above are merely exemplary, and the functions of the respective buttons in the controller 200 may be changed as appropriate. For example, the upward button 210 or the downward button 220 may execute switching between windows in a forward direction or a reverse direction rather than selecting a window of the switching destination. In addition, the selection of the window of the switching destination may be implemented by gazing at an object indicating a camera, or the like.

7. Conclusion

As described above, the present disclosure makes it possible to control switching, on the basis of the motion of the user, between the first window that displays the filmed image of the first camerawork operated by the user and the second window that displays the filmed image of the second camerawork operated by a subject other than the user.

In addition, the present disclosure makes it possible to display the first window or the second window in various modes; in a case of displaying, on one of either the first window or the second window, the other in a superimposed manner, the present disclosure makes it possible to adequately control display modes of the respective windows. Further, the present disclosure also makes it possible to control the progress or the substance of the image content on the basis of the motion of the user.

Although the description has been given above in detail of preferred embodiments of the present disclosure with reference to the accompanying drawings, the technical scope of the present disclosure is not limited to such examples. It is obvious that a person having ordinary skill in the art of the present disclosure may find various alterations or modifications within the scope of the technical idea described in the claims, and it should be understood that these alterations and modifications naturally come under the technical scope of the present disclosure.

In addition, as described above, the present disclosure is applicable to various apparatuses and systems other than the HMD 100. For example, the present disclosure may be applied to a television, a smartphone, a flat display device, or a 3D display device, etc. (in particular, a device with a line-of-sight tracking function, etc.). In addition, the present disclosure may be applied to an HMD of a retinal direct drawing system and image provision using projection mapping. In such cases, display regions of the present disclosure correspond, respectively, to a retina of the user and a predetermined plane of a real space.

In addition, the effects described herein are merely illustrative or exemplary, and are not limitative. That is, the technology according to the present disclosure may achieve, in addition to or in place of the above effects, other effects that are obvious to those skilled in the art from the description of the present specification.

It is to be noted that the technical scope of the present disclosure also includes the following configurations.

(1)

An information processor including:

an acquisition unit that acquires information regarding a motion of a user; and a control unit that controls, on a basis of the information regarding the motion of the user, switching between a first display region corresponding to a first camerawork operated by the user and a second display region corresponding to a second camerawork operated by a subject other than the user.

(2)

The information processor according to (1), in which the control unit controls a display device to simultaneously provide the first display region and the second display region to a field of view of the user.

(3)

The information processor according to (2), in which the control unit allows for displaying, on one display region of either the first display region or the second display region, another display region in a superimposed manner.

(4)

The information processor according to (3), in which the control unit controls a position, a size or a shape of the other display region.

(5)

The information processor according to (4), in which the control unit allows for displaying the other display region not to be superimposed on an object having relatively high display priority in the one display region.

(6)

The information processor according to (4), in which the control unit allows for displaying the other display region to be superimposed on a region of a predetermined rate or more in an object displayed in the one display region.

(7)

The information processor according to any one of (3) to (6), in which the control unit secures a display area for displaying the other display region by moving a position of a camera corresponding to the one display region backward, widening an angle of view of the camera, or reducing a filmed image of the camera.

(8)

The information processor according to any one of (3) to (7), in which the control unit allows for displaying an object corresponding to the first camerawork or the second camerawork on the one display region or the other display region.

(9)

The information processor according to any one of (3) to (8), in which the motion of the user includes: a motion in which the user stands up; a motion in which the user sits down; a motion in which the user moves a neck; a motion in which the user lifts a predetermined controller; a motion in which the user puts down the controller; a motion in which the user presses a button of the controller; a motion in which the user continues to gaze at a specific filming subject for a certain period of time or longer; a motion in which the user continues to gaze at the one display region or the other display region for a certain period of time or longer; a motion in which the user moves into the one display region or the other display region; or the user not performing a move operation for a certain period of time or longer.

(10)

The information processor according to any one of (1) to (9), in which the second display region includes a window displayed inside the first display region.

(11)

The information processor according to any one of (1) to (10), in which the subject other than the user includes a creator of an image content, a user viewing the image content other than the user, or image content software.

(12)

The information processor according to (11), in which the image content includes a free-viewpoint image content or an entire-celestial-sphere image content.

(13)

The information processor according to any one of (1) to (12), in which the control unit controls progress or a substance of the image content on the basis of the information regarding the motion of the user.

(14)

The information processor according to any one of (1) to (13), in which the information processor includes a shielded head-mounted display.

(15)

An information processing method executed by a computer, the method including:

acquiring information regarding a motion of a user; and controlling, on a basis of the information regarding the motion of the user, switching between a first display region corresponding to a first camerawork operated by the user and a second display region corresponding to a second camerawork operated by a subject other than the user.

(16)

A program that causes a computer to implement:

acquiring information regarding a motion of a user; and controlling, on a basis of the information regarding the motion of the user, switching between a first display region corresponding to a first camerawork operated by the user and a second display region corresponding to a second camerawork operated by a subject other than the user.

REFERENCE NUMERALS LIST

100 HMD
110 sensor unit
111 inward camera
112 gyro sensor
113 acceleration sensor
114 orientation sensor
120 operation input unit
130 control unit
131 recognition engine
131a head posture recognition engine
131b line-of-sight recognition engine
132 switch control section
133 window control section
134 content control section
140 display unit
150 speaker
160 communication unit
170 storage unit
200 controller
210 upward button
220 downward button
230 Enter button
240 UP button

The invention claimed is:

1. An information processor comprising:
an acquisition unit configured to acquire information regarding a motion of a user; and
a control unit configured to control, based on the information regarding the motion of the user, switching between a first display region of a display device corresponding to a first camerawork operated by the user and a second display region of the display device corresponding to a second camerawork operated by a subject other than the user,
wherein the first camerawork is determined based on a viewpoint of the user,
wherein the second display region comprises a window initially displayed inside the first display region prior to switching between the first display region and the second display region, and
wherein the acquisition unit and the control unit are each implemented via at least one processor.

2. The information processor according to claim 1, wherein the control unit is further configured to control the display device to simultaneously provide the first display region and the second display region to a field of view of the user.

3. The information processor according to claim 2, wherein the control unit is further configured to control initiate displaying, on one display region of either the first display region or the second display region, another display region in a superimposed manner.

4. The information processor according to claim 3, wherein the control unit is further configured to control a position, a size, or a shape of the other display region displayed in the superimposed manner.

5. The information processor according to claim 4, wherein the control unit initiates displaying the other display region such that the other display region is not superimposed on an object having relatively high display priority in the one display region.

6. The information processor according to claim 4, wherein the control unit initiates displaying the other display region to be superimposed on a region of a predetermined rate or more in an object displayed in the one display region.

7. The information processor according to claim 3, wherein the control unit is further configured to secure a display area for displaying the other display region by moving a position of a camera corresponding to the one display region backward, widening an angle of view of the camera, or reducing a filmed image of the camera.

8. The information processor according to claim 3, wherein the control unit initiates displaying an object corresponding to the first camerawork or the second camerawork on the one display region or the other display region.

9. The information processor according to claim 3, wherein the motion of the user includes at least one of:
a motion in which the user stands up;
a motion in which the user sits down;
a motion in which the user moves a neck;
a motion in which the user lifts a predetermined controller;
a motion in which the user puts down the predetermined controller;
a motion in which the user presses a button of the predetermined controller;
a motion in which the user continues to gaze at a specific filming subject for a certain period of time or longer;
a motion in which the user continues to gaze at the one display region or the other display region for a certain period of time or longer;
a motion in which the user moves into the one display region or the other display region; or
the user not performing a move operation for a certain period of time or longer.

10. The information processor according to claim 1, wherein the subject other than the user includes at least one of a creator of an image content, a different user viewing the image content other than the user, or image content software.

11. The information processor according to claim 10, wherein the image content includes at least one of a free-viewpoint image content or an entire-celestial-sphere image content.

12. The information processor according to claim 1, wherein the control unit is further configured to control progress or a substance of an image content based on the information regarding the motion of the user.

13. The information processor according to claim 1, wherein the display device includes a shielded head-mounted display.

14. An information processing method executed by a computer, the method comprising:
acquiring information regarding a motion of a user; and
controlling, based on the information regarding the motion of the user, switching between a first display region of a display device corresponding to a first camerawork operated by the user and a second display region of the display device corresponding to a second camerawork operated by a subject other than the user,
wherein the first camerawork is determined based on a viewpoint of the user, and
wherein the second display region comprises a window initially displayed inside the first display region prior to switching between the first display region and the second display region.

15. A non-transitory computer-readable storage medium having embodied thereon a program, which when executed by a computer causes the computer to execute a method, the method comprising:
acquiring information regarding a motion of a user; and
controlling, based on the information regarding the motion of the user, switching between a first display region of a display device corresponding to a first camerawork operated by the user and a second display region of the display device corresponding to a second camerawork operated by a subject other than the user,
wherein the first camerawork is determined based on a viewpoint of the user, and
wherein the second display region comprises a window initially displayed inside the first display region prior to switching between the first display region and the second display region.

* * * * *